United States Patent
Nuttle

(10) Patent No.: US 11,468,017 B2
(45) Date of Patent: *Oct. 11, 2022

(54) DATA STORAGE SYSTEM AND METHOD

(71) Applicant: Capital Thought Holdings L.L.C., Fayetteville, NC (US)

(72) Inventor: Allen Nuttle, Fayetteville, NC (US)

(73) Assignee: Capital Thought Holdings L.L.C., Fayetteville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/125,354

(22) Filed: Dec. 17, 2020

(65) Prior Publication Data

US 2022/0027325 A1 Jan. 27, 2022

Related U.S. Application Data

(60) Provisional application No. 63/056,425, filed on Jul. 24, 2020.

(51) Int. Cl.
*G06F 16/00* (2019.01)
*G06F 16/18* (2019.01)
*G06F 16/188* (2019.01)

(52) U.S. Cl.
CPC ........ *G06F 16/1805* (2019.01); *G06F 16/192* (2019.01)

(58) Field of Classification Search
CPC ....... G06F 16/1805; G06F 16/192; G06F 7/14
See application file for complete search history.

(56) References Cited

U.S. PATENT DOCUMENTS

| 7,873,619 | B1* | 1/2011 | Faibish | G06F 16/13 707/823 |
|---|---|---|---|---|
| 8,108,602 | B2 | 1/2012 | New | |
| 8,151,082 | B2 | 4/2012 | Flynn | |
| 9,342,444 | B2 | 5/2016 | Minckler | |
| 2013/0226931 | A1* | 8/2013 | Hazel | G06F 16/134 707/752 |

(Continued)

OTHER PUBLICATIONS

Krzyzanoswki, Paul; "Understanding Paxos; Asynchronous Fault-Tolerant Consensus;" Rutgers University.

(Continued)

*Primary Examiner* — Ashish Thomas
*Assistant Examiner* — Suman Rajaputra
(74) *Attorney, Agent, or Firm* — Forsgren Fisher; Daniel A. Tysver; James M. Urzedowski

(57) ABSTRACT

A system and method are presented that utilize separate append-only arrays to track metadata and real data for a file. All modifications to the file result in metadata records being appended to the end of the metadata array. Write modification commands cause real data to be appended to the file data array. The location of real data on the file data array is identified by a record in the metadata array. Modification commands can be grouped into sets, which complete as a set. Modification sets can rely upon the completeness of prior sets. Read-like commands cause the creation of a virtual array based upon the records of the metadata array. The created virtual array has the same size as the actual file but does not contain the real data for the file. Rather, the virtual file array maps to the actual data stored in the file data array.

20 Claims, 10 Drawing Sheets

(56) References Cited

U.S. PATENT DOCUMENTS

| | | | |
|---|---|---|---|
| 2015/0032982 A1* | 1/2015 | Talagala | G06F 16/178 |
| | | | 711/148 |
| 2015/0052395 A1* | 2/2015 | Wipfel | G06F 3/064 |
| | | | 714/19 |
| 2016/0070652 A1 | 3/2016 | Sundararaman | |
| 2018/0143996 A1* | 5/2018 | Chen | G06F 16/178 |
| 2018/0275880 A1* | 9/2018 | Kumarasamy | G06F 3/065 |
| 2018/0275889 A1* | 9/2018 | Matthew | G06F 12/0246 |
| 2020/0349121 A1* | 11/2020 | Lee | G06F 16/1865 |

OTHER PUBLICATIONS

Ghemawat, Sanjay, Howard Gobioff, Shun-Tak Leung, "The Google File System," ACM Symposium on Operating Systems, Oct. 19-22, 2003, Bolton Langing, New York.

Borthakur, Dhruba, "HDFS Architecture Guide," The Apache Software Foundation, 2008.

Ousterhout, John K., Andrew R. Cherenson, Frederick Douglis, Michael N. Nelson, Brent B. Welch, "The Sprite Network Operating System," Nov. 19, 1987, Computer Science Division, Department of Electric Engineering and Computer Sciences, University of California, Berkeley, California.

* cited by examiner

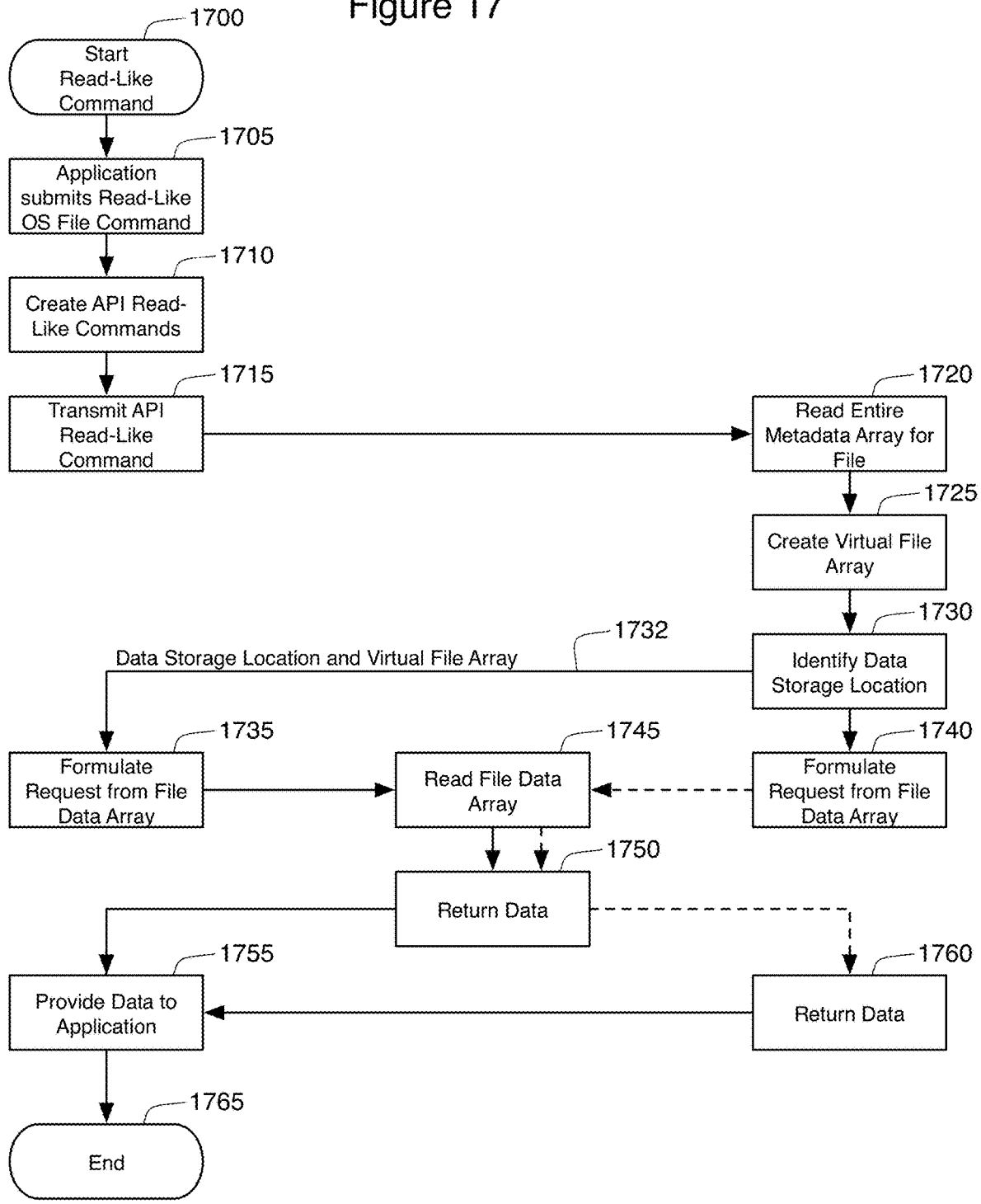

DATA STORAGE SYSTEM AND METHOD

RELATED APPLICATIONS

The present application claims the benefit of U.S. Provisional Application Ser. No. 63/056,425, filed on Jul. 24, 2020, which is hereby incorporated by reference in its entirety.

FIELD OF THE INVENTION

The present application relates to a new system and method for data storage in a computer system. More particularly, the present invention relates to the use of a log-based storage paradigm on a per-file level.

BACKGROUND OF THE INVENTION

Storage devices, such as hard disk drives ("HDDs") and solid state drives ("SSDs"), typically store and retrieve data in "sectors." Hard disk drives store data using circular tracks on magnetic disks divided into physical sectors. Solid state drives use solid state memory that is randomly addressable, but data is read from and written to these devices in pages that can be considered logical sectors. The two major reasons for the strong orientation around sectors are the physical placement of information onto the storage medium and the need for error checks. By doing an error check on a sector-by-sector basis, it is easy to determine whether an individual sector is readable (with correctly preserved information) or is unreadable. If the error check indicates some problem with a sector, the storage device returns no information and presents a clear indication of an error.

There are many schemes in the prior art that aggregate multiple components or devices together in order to present a "sector server" that has better properties than an individual HDD or SSD. These types of aggregations can provide, for example, a larger capacity than is typically available on a single device, a tolerance for the loss of information (from unreadable sectors or failed devices), a greater I/O bandwidth or throughput, a reduced latency time, or a different balance in the cost vs. performance trade-off. At the same time, there are schemes to partition devices (or some other set of sectors) so that different, independent uses may be made of these subsets. For examples, partitions and volumes can be created, with the former referring to a set of sectors on a single data storage device, and the latter referring to a logical aggregation of sectors that can span multiple physical devices. Regardless of how the devices are organized, and regardless of whether the sector server comprises a portion of a single device or is an aggregation of multiple HDDs and/or SSDs, a sector server allows addressed access to individual data sectors with the storage. This access can sometimes take the form of a sector array, each sector in the array having a single array address.

Although there are exceptions, such as the use of a raw storage volume for a classic database, sector servers are normally used to support a filesystem. In most filesystems, there is a superblock made up of a fixed number of sectors at a well-known address that has global information for the file system. The superblock will include a description of an array of inodes. As inodes comprise a fixed number of sectors, it is easy for the superblock to provide quick and easy addressing to all of the inodes.

In a standard file system, each inode stores data for one file, with directories usually considered just a type of file that can be identified by an inode. Each inode is associated with a unique number or identifier. This identifier is the native name for a file, and directories use the inode number to reference individual files. Each inode contains metadata about the file as well as the information necessary to address all of the sectors that store data for that file. The list of sectors for a file may be quite long. Most inode systems provide the ability to utilize an addition level or two of indirection, with the inode pointing to a separate list of sectors used by the file instead of directly to the sectors themselves. In some cases, the metadata itself is so large that it cannot be contained in the inode and must also be stored in other sectors. Thus, other sectors outside the inode may also store metadata for a file, meaning that some means of enumerating these sectors is incorporated into the inode.

File systems generally have a fixed number of inodes, and therefore must track which inodes are in use and which are free. Furthermore, the file system must track which sectors on the storage media or sector server are in use and which are free. In both cases, this information is tracked using bitmaps, with a single bit for each inode or sector indicating whether the inode or sector is in use or is free.

There are a multiplicity of file systems that have been developed over the years in order to optimize one aspect or another of the file system. One example file system is a log-structured file system. This type of file system, which was first proposed in 1991 by John Ousterhout and Mendel Rosenblum, writes both data and metadata to a circular buffer or log. All writing to the file system is done sequentially on the log, and data is never altered by overwriting blocks on the log but only by adding new blocks onto the end of the log. This has tremendous benefits when writing to sequentially-oriented storage devices, such as HDDs, since seeks are not needed when writing sequentially on the log. Data for all files are stored on the same log, and when files are altered the altered data blocks are merely rewritten onto the end of the log. Inodes that maintain files for the file system and identify the block addresses for data in the log are also written to the same log, with alterations to the files requiring that a new, revised inodes for the file also be written to the end of the log. Indexes pointing to inode locations on the log are also stored directly to the log. When the storage device is full, the circular log returns to the beginning of the device and performs garbage collection to free up open space.

Append-only file systems, such as the Hadoop Distributed File System or HDFS, have been developed to be most efficient when writing files that never change. In HDFS, there are restrictions on the operations that can be performed on a file. It is forbidden, for instance, to overwrite previously written data. Data may only be written to the end of the file. If it is necessary to modify a file that is already written, the entire file must be rewritten to replace the prior file.

SUMMARY OF THE INVENTION

The present application describes systems and methods that utilize append-only arrays to track metadata and real data for a file, with metadata and real data being stored in separate arrays. In one embodiment, a single file data array containing real data exists for each file. In addition, a single metadata array exists for either a single file or for a limited number of files that are directly related to each other (such as main database file and a journal file). In some embodiments, only a single file is managed by each metadata array. Other embodiments are possible in which related files are managed by a single metadata array. In these embodiments, the real data for the related files may remain in separate file data arrays or may be combined into a single file data array.

All modifications to the file result in metadata records being appended to the end of the metadata array. Only certain modification commands, perhaps only modifications made via the write command, alter the file data array by appending data onto the end of the file data array. Other commands may alter the content of the file but will not alter the file data array, such as the insert, delete, or copy commands.

In one embodiment, modifications made to files are grouped together into modifying operation sets. Each set is associated with a set identifier, which can include a universal time stamp. The set of operations including the set identifier are written to the end of the metadata array as modification records. All operations that alter the file data array within a set are merged together to create a single addition for the file data array. This merged addition is appended to the end of the file data array, and the offset and length of this addition are noted. A metadata record that contains this location information and the set identifier for the modifying operation set that caused the change to the file data array is then appended to the metadata array. Only after both the metadata records for the modifying operation set and the metadata record identifying the location of any real data are recorded on the metadata array is the set considered "complete." Incomplete sets are generally rejected by the system when applying read-like operations to the file. Determining and relying upon the completeness of a set of modifying operations allows the present invention to ensure atomicity.

In some embodiments, new modifying operation sets are able to depend upon the completion of a prior modifying set. This dependence can be identified in the set itself. If the set depended upon is not complete, the new set will be recorded by the system but may be rejected as dependent on an incomplete set during subsequent read-like operations. In this way, a single modifying set can be both written to the metadata array and be incomplete. This dependence also allows the system to be fully transactional, as it adds both consistency and isolation properties for client data in addition to the durability provided by all storage systems and the atomicity described above (as these terms are used in connection with transaction processing).

Read-like commands trigger an analysis of the metadata array in order to create a virtual file array for the file or files managed by the metadata array. The virtual file array has the same size as the actual file but does not contain the real data for the file. Rather, the virtual file array maps to the actual data stored in the file data array. Because the file data array may alter the size of the data during storage, such as through compression, the size of the virtual file array will not necessarily equal the size of the data mapped to in the file data array.

The virtual file arrays are typically created using the entire metadata array, but this assumes that all modifying operation sets are completed. Incomplete operation sets are generally not included in the creation of the virtual file array. In other words, any incomplete modifying operations are filtered out. Furthermore, it is possible during read-like operations to identify a particular modifying operation set (such as by specifying a set identifier or specific time) as the snapshot location for the operation. This effectively establishes a cursor location within metadata array. When this feature is used, the virtual file array is created by reading the metadata array from the beginning to the cursor location. Metadata records that identify real data locations for modifying operation sets that are included in the identified snapshot portion are also utilized to identify data for this snapshot virtual file array even if the metadata record identifying the real data location was recorded to the metadata array after the cursor location.

BRIEF DESCRIPTION OF THE DRAWINGS

FIG. 17 is a flow chart showing a process for implementing a read-like command.

DETAILED DESCRIPTION

Cloud-Based Object Storage

Figure 1:
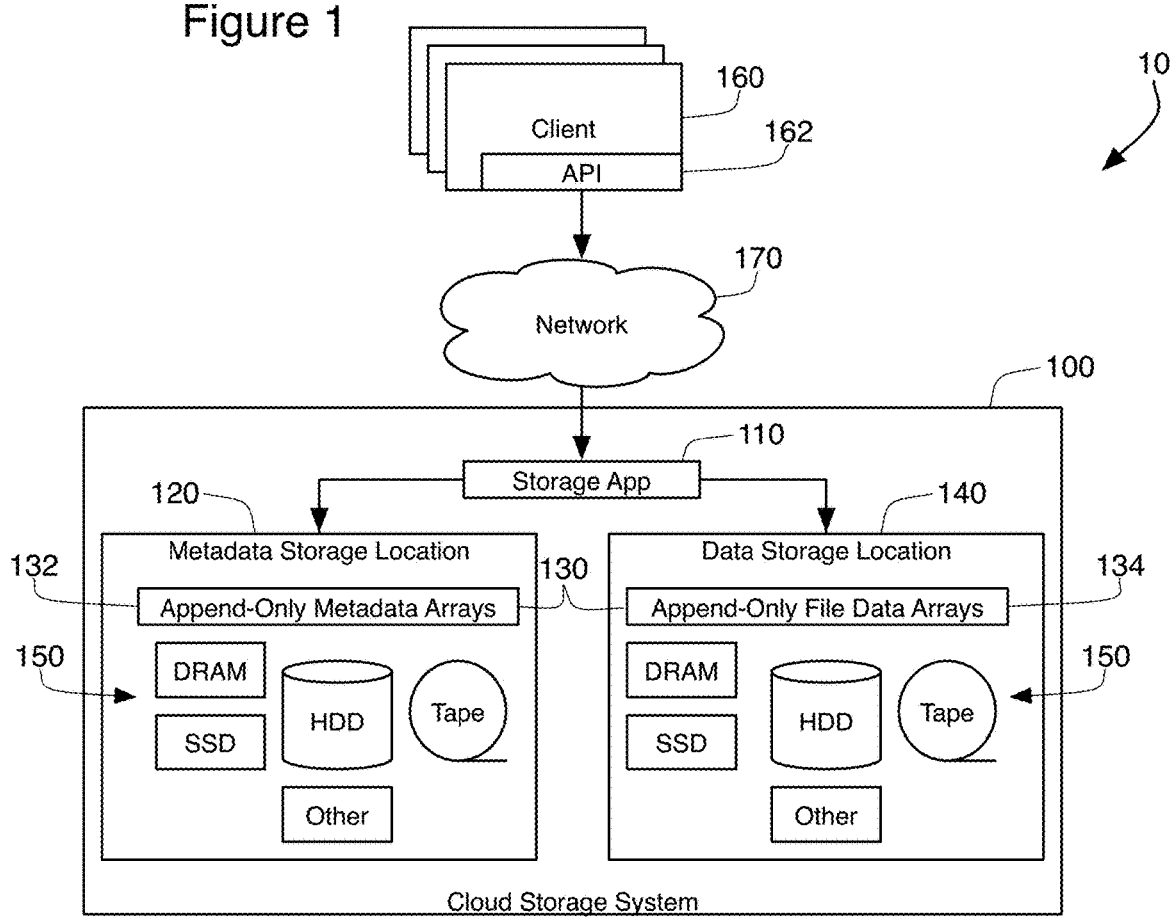
FIG. 1 is a schematic view of a first system for implementing the present invention.

FIG. 1 shows a first system 10 that is capable of implementing one embodiment of the present invention. In this system 10, a cloud storage system 100 is used to store data that is made available to one or more clients 160 over a network 170. The network 170 may be a wide area network such as the Internet. Alternatively, the network 170 could be a local area network or LAN. Each client 160 in the system 10 will use the application programming interface (or "API") 162 of the system 10 to access and store files onto the cloud storage system 100.

In most embodiments, the actual storage internal to the cloud storage system 100 will be implemented as an object storage solution. Object storage provides a different level of abstraction than that provided by file systems, which makes it an ideal technique for handling cloud-based storage. The idea behind object storage is to provide a storage system requiring no knowledge of local addressing schemes, such as those discussed in the background section for sectors and for inode numbers. The object storage system keeps data on other systems, and these systems track, for example, the free sectors on the physical devices. This means that there is no need to make inode and sector information visible as part of the API of the object storage system.

This extra layer of abstraction is useful because it allows for a separation of concerns. Each local server in an object storage system can manage its own resources, such as free sectors, and is responsible for organizing sectors into object storage objects. An object storage server does not serve access to sectors. Rather, it serves access to objects, which may contain data modeled as a single array and metadata of various kinds. Some of this metadata is internal to each server or local to each device, but some of it makes up the metadata store used by the clients of the object storage system.

Since sector management is an internal matter for the cloud storage system, it occurs invisibly to clients and applications outside the system. Users of the cloud storage system therefore remain oblivious to sector level activities that occur at the server level inside the system. Only servers inside the system need to deal with items such as moving data between tiers or across devices or the defragmentation of an HDD.

In one example implementation of an object storage system, individual servers work together to expose an object storage API. Each server then stores data using a local filesystem on each server. To transform this type of object storage system into a distributed file system, a database is used to impose a directory structure for the file system and then identify where file data is stored in the exposed object data. The object storage approach allows file systems built on top of object storage to have a more idealized and natural model for a file. It also means all the local processing becomes perfectly parallel—each server can handle these things for the storage devices it owns, and the file system can remain oblivious to the internal workings of the servers.

Systems 10 and 20

System 10 of FIG. 1 utilizes a distributed filesystem maintained on an object storage solution. In other words, system 10 provides a file system to the clients 160 of the system 10 while storing the data using cloud-based object storage. In an alternatively embodiment, present invention could also be used to allow the clients 160 to use the API 162 to store other types of data onto system 100. In the preferred embodiment, the API 162 used by the clients 160 is a wire-level protocol handling remote procedure calls (a wire-level RPC interface).

In system 10, the cloud storage system 100 utilizes one or more storage applications 110 to control and manage metadata and real file data. The metadata and real file data (the data for a file can be called "real data," "file data," or is sometimes simply referred to herein as the "data") may be stored at two or more different locations in the cloud storage system 100. In FIG. 1, the metadata is stored at the metadata storage location 120 and the real data is stored in the data storage location 140. Each of these locations 120, 140 provides an object storage API interface to the storage app 110, which in turn can manage file-based requests from the clients 160. Note that these separate locations 120, 140 may store data on separate, remotely located machines and devices.

Metadata is stored as an append-only metadata array 132 at the metadata storage location 120. In one embodiment, a separate metadata array 132 is used for each file in a file system maintained by the storage application 110. Similarly, real data is saved as an append-only file data array 134 at the data storage location 140. As with metadata, each file data array 134 is generally used for a single file. The metadata arrays 132 and the file data arrays 134 are both examples append only arrays, referred to by figure number 130 in FIG. 1. Every file handled by the storage application(s) 110 will be associated with a metadata array 132 and a one or more file data array 134. Zero-length or empty files are possible in system 10 and will simply have a data array length of zero.

The storage application 110 consists of programming code that is responsible for locating the metadata arrays 132 and the file data arrays 134 and performing the methods and processes described below. The storage application 110 does not need to be a centrally located process, as portions of the application 110 can be found at a variety of locations, such as within metadata storage location 120, data storage location 140, or even within the API 162 found on the clients 160. Portions of the application 110 found at locations 120, 140 can be embedded within the cloud object storage system or implemented as a separate layer within those locations. IDs associated with the append only arrays 130 are used by the storage application 110 to identify and locate the appropriate arrays 130 for a requested file.

The information stored at locations 120, 140 can be stored on a variety of storage devices 150. For example, the metadata storage location 120 might store some of the data found in the metadata arrays 132 in DRAM cache memory for quick access, or on SSDs, HDDs, or even tape drives. These different storage devices 150 have different performance and cost characteristics. For instance, SSDs are generally faster and more expensive for storage than HDDs, which in turn are faster and more expensive than tape devices. DRAM cache is faster than SSDs, but it is both expensive and can be volatile in nature if not carefully managed. By storing data on different types of storage devices 150, the storage locations 120, 140 can utilize tiering, where older, non-changing, and less-frequently-viewed data can be transitioned to slower and cheaper storage tier (such as HDDs and tape drives), while newer, frequently-changing, and frequently-viewed data can be kept on a faster, more expensive storage tier (such as DRAM caches and SSDs). It is important to note that the append-only arrays used in the present invention are especially amendable to tiering.

Figure 2:
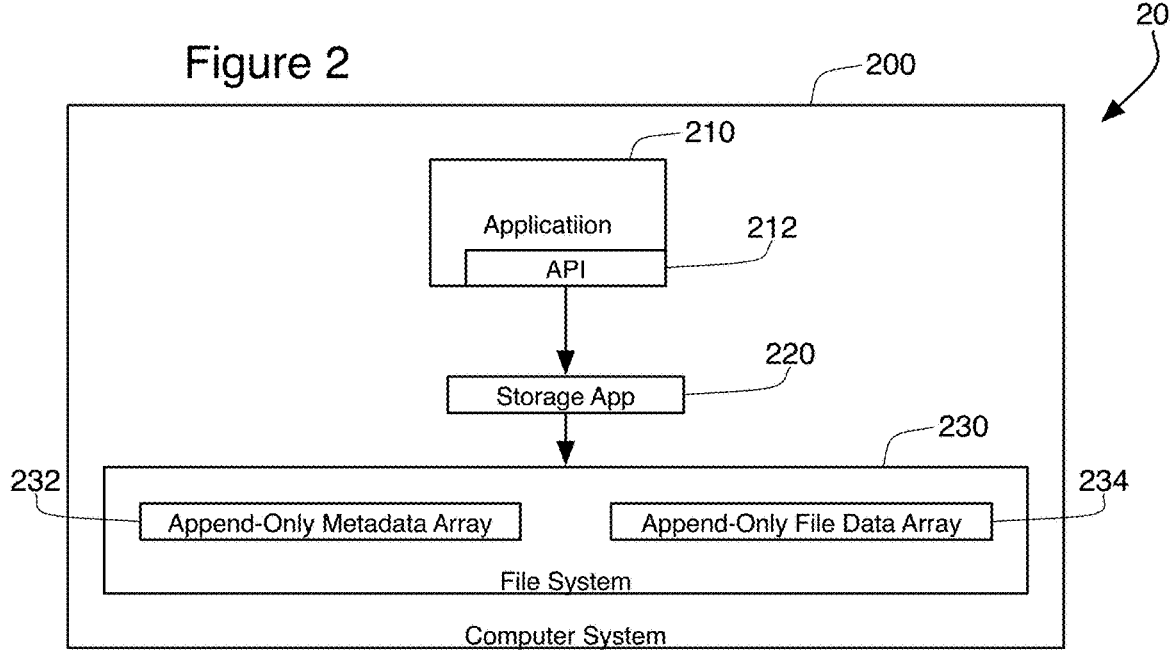
FIG. 2 is a schematic view of a second system for implementing the present invention.

FIG. 2 shows storage system 20, which can be implemented on a single computing device 200. A computing device (or "computer system") is generally a stand-along desktop or laptop computer or server, but it may also take the form of a mobile device such as a tablet computer or even a smart phone. This device 200 has a variety of components that are found on all such computing devices but are not shown in FIG. 2, such as one or more processors, user input and output devices, physical memory and storage devices, and networking interfaces. Rather than showing these elements, FIG. 2 focuses on components that are used implement the storage system 20. In particular, an application 210 running on the computer system 200 uses the application programming interface 212 developed for the storage system 20 to read and write data. The API 212 defines the interaction between the application 210 and a storage application 220. This API 212 used in system 20 could be identical to the API 162 used in system 10. The storage application 220 manages the append-only metadata arrays 232 and the append-only file data arrays 234 used to create system 20. More particularly, the storage application 220 manages these arrays 232, 234 by storing them directly on the local file system 230 of the computer 200. The append-only metadata arrays 232 and the append-only file data arrays 234 store the same metadata and real data as arrays 132, 134 described above in connection with system 10. Also like the arrays 132, 132 from system 10, the arrays 232, 234 from system 20 are also append-only arrays 130.

In one embodiment, the metadata array 232 and the file data array 234 are saved on the local file system 230 as ordinary files. The records or data that would otherwise be appended to the append-only arrays 130 would simply be appended as normal data to the files on the files system 230.

Append-Only Arrays 130

Both system 10 and system 20 use append-only arrays 130 to store metadata and file data, with one array 130 being used to store metadata for a file and a separate array 130 being used to store real data for that same file. As explained in further detail below, it is possible that the real data for a single file will be stored in multiple arrays 130. While it is possible to combine both the metadata and real data for a file into a single array, this would create complexities and difficulties that are not encountered when separate arrays are used for the metadata and the real data. Note also that most of the present disclosure will describe an embodiment with each array 130 containing metadata or real data for only a single file, although some embodiments that are described below do allow for the possibility of related files being managed by single arrays 130.

The separation of metadata and real data into separate append-only arrays is one of the fundamental differences between the systems 10, 20 shown in FIGS. 1 and 2 and the prior art log-structured file systems. Log-structured file systems use a single log file to contain all metadata and all real data for every file maintained by the file system as well as for internal filesystem metadata. This separation of metadata and real data into separate arrays, and the further segmentation into separate metadata arrays and separate file data arrays for individual files (or groups of files) allows for various benefits that are not possible with prior art systems, such as the method for snapshots and versioning described herein. This doesn't mean that it isn't possible for the systems 10, 20 to be used to store data into the separate metadata and file data arrays, simply that these systems 10, 20 on their own do not teach or make use of such separate append-only arrays. Furthermore, it is important to note that the present arrays 130 are used as the core organizing principal for storing and persisting data. In this way, the use of separate metadata and real data append-only arrays is quite different than other uses of append-only data structures that apply only in the context of temporary cache or other transient formats.

Figure 3:
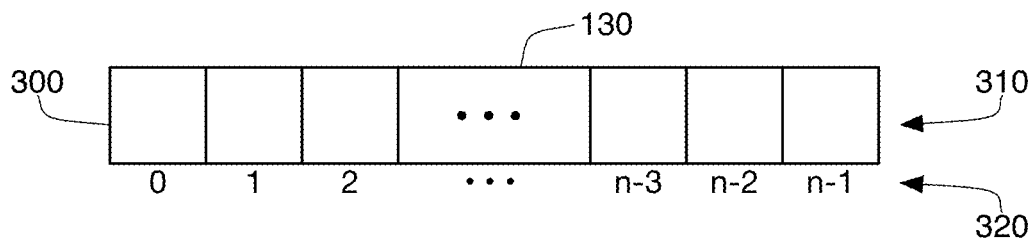
FIG. 3 is a schematic view of an append-only array.

An append-only array 130, such as the array 300 shown in FIG. 3, is a persistent array, meaning that it is managed in a manner to ensure its persistence in storage. The array 300 can be stored on an object storage system such as those provided by storage locations 120, 140, but it can also be stored into a normal file system 230 or any other type of storage system. In addition, as an append-only array, array 300 will be maintained using an "append-only" pattern. This append-only operation, along with the separation of the metadata and real data of the file system into separate arrays 300, enable many of the optimizations and simplifications of the present invention described herein.

In FIG. 3, array 300 is shown having a length of n. The array 300 therefore contains n cells or records 310, each of which can contain data. Each array cell 310 is identified by an array index 320 in the following range: 0, 1, 2, ..., n−2, n−1. As an append-only data structure, the only permitted operations on array 300 are truncating the array 300 to length zero (changing n=0), which effectively deletes the array 300, and appending data to new cells or records at the end of the array 300. Of course, when data is appended, the length of the array 300 (n) is increased based on the length of the newly appended data.

Figure 4:
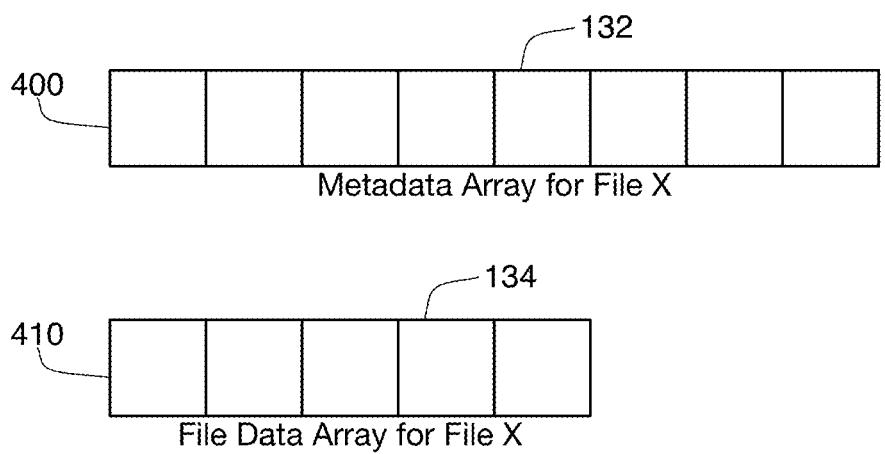
FIG. 4 is a schematic view of a metadata array and a file data array for file X.

File system 10 is managed through a combination of a metadata array 132 and a file data array 134, while system 20 is managed through metadata array 232 and a file data array 234. FIG. 4 shows a metadata array 400 for file "X" and also a file data array 410 for file X. The file data array 410 contains all the real data found in file X, as well as data that previously existed in file X. The persistence of all data that has ever existed within a file in this array 410 is a key feature of the present invention and is described in more detail below. The metadata array 400 contains records that describe operations performed on file X. A record in this context is data that defines one or more operations that are performed on file X. Any operation that modifies file X is called a modifying operation, and every time a modifying operation is performed on file X, information about that modification will be stored in a record appended to the end of metadata array 400. Some modifying operations will also require appending data to the file data array 410 for file X.

An operation on file X that does not modify the file is called a read-like (or non-modifying) operation. Read-like operations do not append to, or otherwise modify, either the metadata array 400 or the file data array 410. Operations requested from clients 160 (or applications 210) can be categorized as either modifying operations or read-like operations. Other operations can be performed on a file, such as internal operations controlled by the cloud storage system 100 or the file system 230. These internal activity operations can also append metadata records to the metadata array 400 for file X.

The metadata stored in the metadata array 400 need not be limited to information concerning modifying operations for a file. For example, files can be associated with user metadata that determine which users have various privileges to access and alter the content of a file. Metadata may also relate to the file's type, or which default application can be used to work with the file. In some embodiments, this type of additional metadata is stored in the form of key/value pairs. The values in the key/value pairs can either be large or small. Small values can be contained within the metadata array 400. In some embodiments, large values are stored on the file data array 410 in the same manner as used to store real file data (using, for example, the payload records described below). In still other embodiments, the present invention is implemented using existing storage structures (such as a local file system or an object storage system). Since these existing store structures already manage this type of non-modifying operations metadata, these facilities can be utilized to manage some or all of this type of metadata.

It is possible to implement the storage locations 120, 140 using systems designed for append-only operations, such as HDFS. While HDFS is limited in that the files it maintains can never be modified, it is a useful technology for implementing the append-only arrays 130 utilized in the present embodiment.

In the preferred embodiments, the metadata array 400 is persisted using redundancy for fault tolerance. This will typically be accomplished through replication, although RAID redundancy is also possible. Since metadata arrays 132 such as array 400 are typically small and the data being appended for any given operation is also quite small, replication is the preferred redundancy strategy. In a distributed system, replicas of the metadata array 400 would normally be kept on different machines. Known algorithms, such as the Paxos protocol algorithms, can be used to maintain the set of replicas and either to add records to the set of replicas or to elect and maintain a master replica to add such records. The metadata array 400 can also move across tiers, such as the tiers for the DRAM, SSD, HDD, and tape storage devices 150 in metadata storage location 120. Because all modifying operations will simply append records onto the metadata array 400, it is possible to split the metadata array 400 across multiple tiers 150. The first records in the array 400 could be stored on less expensive tiers stored on slower storage device tiers 150 while still keeping write activity at the end of the array 400 within an active tier stored on more expensive, faster devices 150. Such automatic tiering can be implemented using the storage locations 120, 140 themselves. An HDFS system, for example, may make assumptions on the non-changing nature of older data in the append-only arrays 130 to perform automatic tiering in a manner that is very congruent with the need for tiering of arrays 400, 410.

Similarly, the file data array 410 is also protected through redundancy by either replication or by being split up using techniques from RAID (particularly distributed RAID). As with the metadata array 400, the file data array 410 is append-only, so this array 410 may also be split between multiple tiers with older, less-active data being stored on less expensive tiers.

Relationships Between Files and Arrays

Figure 5:
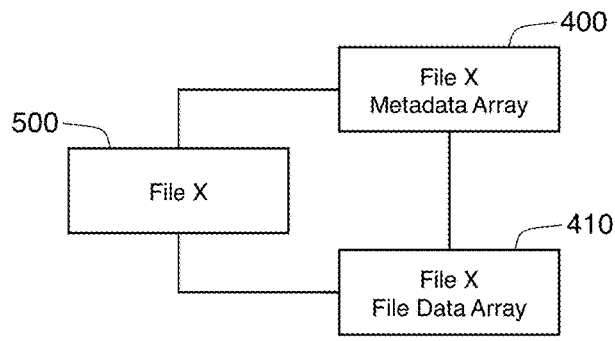
FIG. 5 is a schematic view identifying the relationships or associations between a file, a metadata array, and a file data array.

In the above-described embodiment, the metadata array 400 and the file data array 410 both contain information for a single file, namely file X. In these embodiments, the metadata array 400 is related to file X 500 in a 1-to-1 relationship, as is shown in FIG. 5. During set up, of course, a metadata array 400 may be established containing no records, meaning that it would be possible in these same embodiments that the array 400 would relate to no file (as opposed to be related to a single file 500). In addition to a typical 1-to-1 relationship between file X 500 and metadata array 400, the above-described embodiments describe a 1-to-1 relationship between the metadata array 400 and the file data array 410. In some embodiments, however, a metadata array 132 and a file data array 134 can be merged into a single append-only array 130. In this type of embodiment, the content of the file data array 134 would be interleaved with the content of the metadata array 132. This arrangement, however, is typically undesirable (except possibly in the case of a tape tier). Finally, while it is possible to generate embodiments where there are different sorts of correspondence between each file and the data array 410, one common embodiment uses a separate data array 410 for each file 500 in the same 1-to-1 correspondence shown in FIG. 5.

In other embodiments, multiple files can be managed by a single metadata array 132. This type of embodiment is primarily useful for two specific uses cases: 1) where a small number of related files are used by a single application that can benefit from atomic operations, snapshots, and data copying across the files; and 2) for internal usage in compacting or organizing the contents of persistent data arrays or in moving persistent data arrays across tiers. As an example of the first use case, a database system may use multiple, related files as it updates the data it is managing. A first file could be the main file used by the database for persistence of the data it maintains (i.e., the main, permanent storage of data). The second file could be a journal file used by the database to persist updates which have not yet been incorporated into the main file. An example of this type of system is described below in connection with FIG. 9.

Another possibility involves composite files, which are stored and generally viewed as a single file, but this file can be manipulated as a collection of separate but related files. An example of this is a container file that stores multiple, separate images in a single file.

Each append-only array 400, 410 has an identifier that indicates the object storage system or normal filesystem storage entity that stores the given array. These identifiers may be related to the identifier used to identify the file 500. The former identifiers may be managed by the object storage system or normal filesystem, but the actual file identifiers (names) are typically provided by the logic in the storage API or app 110, 162, 212, 220. In some implementations, the associations between 500 and 400, and between 500 and 410, may be maintained only through naming conventions. In other implementations, some form of database may be employed to maintain these associations.

Modifying Operations

Operations to the files in systems 10 and 20 are performed using the application programming interfaces 162, 212, respectively. API 162, for example, will define all possible operations that a client 160 may perform on a file X 500 that is stored in system 10. Operations defined by API 162 can be classified as either modifying operations or as read-like (or non-modifying) operations. All modifying operations to file X 500 result in appending one or more records to the end of the metadata array 400. However, not all modifying operations will result in a modification of file data array 410. As explained in more detail below, some modifying operations require payload data, and only these types of modifying operations will append anything to the file data array 410 for file X 500. While it is possible to develop various permutations of the operations within API 162, one embodiment of the API 162 yields includes only a single operation (the "write" operation) that requires payload data.

Because both the metadata array 400 and the data array 410 are append-only arrays 130, changes are made by appending records on to the end of these arrays. In the context of the metadata array 400, these records effectively take the form of journal records indicating actions performed on the related file. In the context of the file data array 410, these records constitute actual file data. As such, each record may be a page or block of data in a file. In actuality, any unit of data could be used to indicate a separate record in the file data array 410, such as segment or even a word or byte. This disclosure will refer to each element as a unit of data (or simply as data).

These changes will occur in a natural order based on the timing of when the operations are received by the storage app 110, 210. However, there is no sequence interlocking between any of these appended records. In particular, there is no relationship between a record in the metadata array 400 and a potentially related data record in the data array 410 that is based upon either record's position within the arrays 400, 410. Instead, once payload data has been appended to the data array 410 for file X, another record is (or multiple records are) written to metadata array 400 to identify where this payload data has actually been persisted. The recorded record can be called the payload or location record. This independence between the metadata array 400 and the file data array 410 requires that there be some identification or other means of associating payload data in the file data array 410 with the records of the metadata array 400 that wrote this data to the file. In one embodiment, the metadata records in the metadata array 400 identify data by identifying a specific data array 410, an offset (which takes the form of an array index 320), and a length in order to identify particular data in the array 410. As explained above, the file data array 410 does not need to have been persisted on the same device 150, in the same tier, or even on the same machine as the associated metadata array 400.

Figure 6:
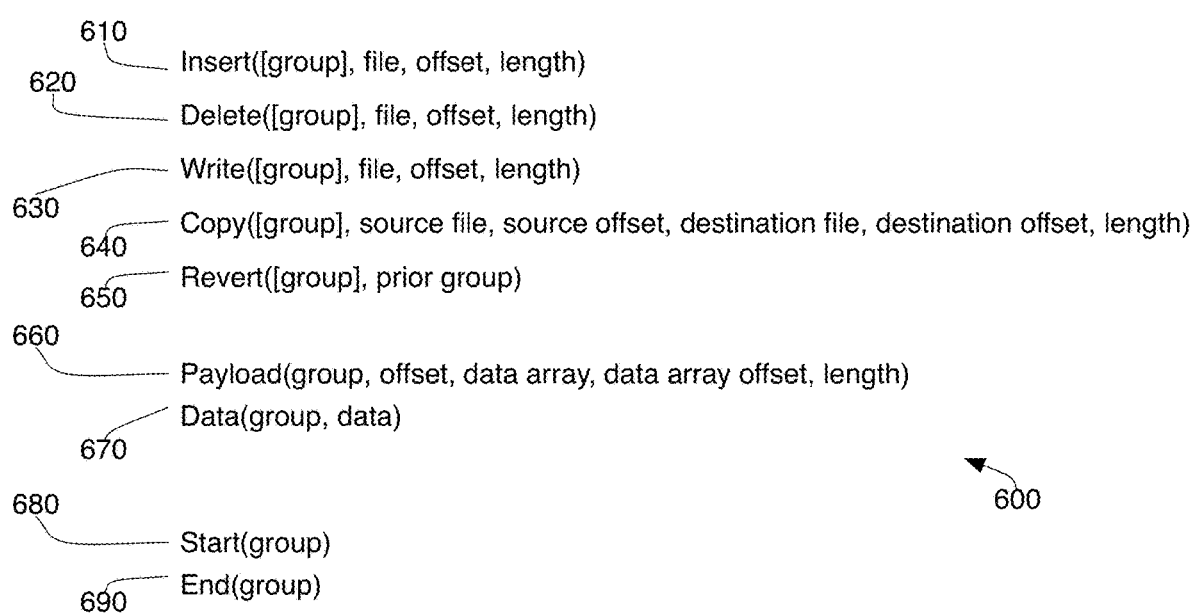
FIG. 6 is a list of modifying records/operations and a related payload record.

FIG. 6 shows the modifying operations 600 that exist in one embodiment of API 162. The list of operations 600 represents the commands or operations that can be requested by a client 160 in system 10 (or by an application 210 in system 20). This list 600 also represents the records or data that are stored in the metadata arrays 132, as there is a close correlation between the modifying operations 600 received through the API 162 and the records that are stored in the metadata array 132.

The modification operations 600 include insert 610, delete 620, write 630, copy 640, and revert 650 operations. In addition, FIG. 6 shows the payload record 660 (sometimes referred to as the "location record" 660) that is used to identify file data in the file data array 134. The payload record 660 is closely associated with a data submission 670 submitted by the client 160 through the API 162. The data command 670 includes the real data associated with a file. Because the data command includes real data, this command is not stored as a record on the metadata array 132. Instead, most embodiments record the data by appending it to one or more (e.g. RAID) file data arrays 134 and then record a payload record 660 on the metadata array 132 indicating where the data has been stored on the file data array(s) 134. Finally, start 680 and end 690 commands are used to define a set of modifying commands identified by a group identifier.

FIG. 6 identifies specific parameters that are used with each of these operations 600. The first parameter in the first five modification operations 610-650 is an optional group parameter. As explained below, modification operations 600 are generally grouped together in sets using the start 680 and end 690 commands. This grouping syntax can identify the group identifier, obviating the need to include the group parameter within each operation 600 (hence this is shown as an optional parameter in FIG. 6). In some embodiments, a single modifying command 600 can form its own group, and the syntax would then allow the group identifier to be placed directly in the parameter list of the command 600. In other embodiments, it is possible for multiple groups to become interleaved on the metadata array 400, which would require the inclusion of the group parameter with each operation 600 in order to identify the member of each group. A single client would not normally interleave modifying operations in this manner, so any interleaving of operations from different groups ordinarily implies multiple clients that are not coordinating modifications.

The "file" parameter found in the insert 610, delete 620, and write 630 operations identifies a particular file, such as file X 500. In embodiments where the metadata array 132 relates only to a single file, such as the file X metadata array 400 relating only to file X 500, this parameter could only have a single value—namely the identifier for file X. As such, it is possible to implement a system in which the file parameter is not needed within modifying operations 600 when a 1-to-1 relationship is otherwise assured between the metadata array 400 and a file 500. In embodiments when a single metadata array 132 is related to multiple files, this file parameter identifies the file that was subject to the modifying operation 600.

The offset parameter identifies the offset location for the operation with respect to the beginning of the file. In one embodiment, an end-of-file (or "EoF") identifier can be used as the offset parameter to indicate the end of the file. The EoF offset is generally equal to the file's current length. However, in situations where the length of a file is as of yet indeterminable, the EoF parameter can be used instead. Note that the EoF offset only make sense in the context of the file (such as file X 500), as there is no "end of file" in the context of the file data array 410 for file X. One important point is that the EoF reference is retained in the Metadata Array—it is only translated into an actual offset in the context of read-like operations. In other words, the current length of a file (and thus the EoF offset location) only becomes definite in the context established for read-like operations. In some embodiments, negative offsets are also allowed, indicating a position that is determined backward starting from the EoF. The length parameter indicates the length of the amount of data being operated upon by the operation.

The insert operation 610 inserts or opens up a hole (a portion of the file containing no data) of a particular length at a particular offset in the file. The insert operation 610 therefore will increase the size of the file by the given length. The delete operation 620 deletes a portion from a file of a given length at the identified offset. Therefore, the delete operation will decrease the size of the file.

The API shown does not include a means of permanently removing a file 500. Given the snapshot process describe below, the removal of a file would be a cleanup operation, to be used only when it is known that no contents of any file 500 associated with a given metadata array 400 is ever going to be accessed again. For example, there are sometimes legal requirements to permanently remove data. It would be possible to add an API element to accomplish this, such as an "Obliviate" command since "Delete" has a different meaning in the API discussed herein. This could permanently remove the append-only metadata array 400 and all associated file data arrays 410. Another form of deletion is removing a file from a directory, but details of how directories are implemented are not proscribed herein. Tiering also provides a means of reclaiming storage capacity. Tiering could, for example, move the append-only arrays 400, 410 onto tape, most commonly as a single combined array such as is described below in connection with FIG. 14. The combined array format is also useful for transforming all of the information from a set of metadata and data arrays into a single traditional file. This may be desirable in order to back this information up in another storage system, including other cloud storage systems.

The write operation 630 identifies new content for a portion of a file. The write operation 630 identifies the file, the offset location, and the length of the written data. The actual data, however, is not identified in this command, but will be submitted separately using the data command 670 and then specified within the metadata array 400 using the payload record 660. A client 160 using API 162 to write to the file will use the write command 630 and will submit the actual data to be written to the storage application 110 using data command 670. A write operation 630 for File X 500 will be written to the metadata array 400, which is stored in the metadata storage location 120. Note that this form of write command may be used to overwrite data, but only as it is projected into the virtual data array. It may also be used to append data, or to fill in any portion of a hole which has been created by an insert command. These API semantics support traditional file write and truncation operations, but also add new capabilities, which may be useful for many applications. However, this requires having an application that makes use of the new capabilities in the API.

In one embodiment, the storage application 110 ensures that the actual file data submitted with the data command 670 is stored on the file data array 410, which may be stored on a different device or even a different physical machine 140. This data is received from the client 160 by the storage application 110 and placed on the file data array 410 at the data storage location 140. The identity of the file data array 134, the offset within that array 134, and the length of the data are all noted by the storage app 110 for the creation of payload record 660. As is explained in further detail below in connection with FIGS. 15 and 16, some embodiments will request the client 160 to separately send the data directly to the data storage location 140, and even have the client 160 and its API 162 be responsible for reporting the data for the payload record 660 back to the storage app 110 at the metadata storage location 120.

When the data has been stored, the payload record 660 will be created identifying where that data has been stored, and this payload record will then be added to the file X metadata array 400. The payload record 660 must be recorded in the metadata array 400 for File X any time that a write command 630 has been recorded. But the payload record 660 might not be recorded within the metadata array 400 at the same time as the write command 630. In fact, it is possible that other records may exist on the metadata array 400 between the write operation 630 and its corresponding payload record 660. Furthermore, it is even possible for the payload record 660 to be placed on the metadata array 400 before the write command 630. Consequently, the payload record 660 utilizes a group identifier parameter to identify the group containing the matching write command(s) 630.

The copy operation 410 copies portions of one file to another. The copy operation does not need to be associated with a payload entry, for it need only identify the source file data (file, offset and length) and the location in the destination file where the data is to be copied. The revert operation 650 will be described in more detail below in connection with modifying operation sets.

The specific modifying commands 600 shown in FIG. 6 are merely exemplary for one embodiment. Alternative configurations of these basic commands would be known in the art. For instance, write commands 630 in some file systems can exclude the offset parameter, with the assumption being that all writes 630 occur at the EoF if no offset is specified. Similarly, some of these same file systems do not require an insert command 610 when writes 630 are made at EoF—the insert 610 functionality is assumed. These and other variations could clearly be made to the functionality provided by these commands 600.

Modifying Operation Sets

Figure 7:
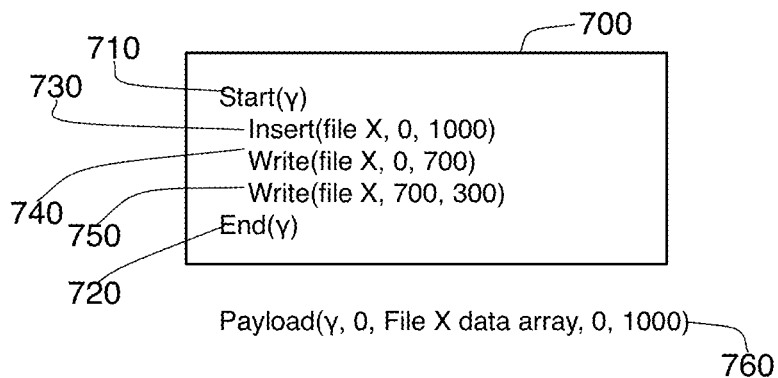
FIG. 7 is a schematic illustration of a modifying operation set and a related payload record.

In the preferred embodiment, modifying operations 600 occur within a set or group of such operations, including the case of single operation sets. FIG. 7 shows a group or set 700 of modifying operations that is bracketed by a start command 710 and an end command 720. Both of these 710, 720 identify the set through the use of an identifier, which in FIG. 7 is shown as the Greek letter "γ." This set 700 also includes an insert command 730 and a first write command 740 and a second write command 750. The order of performing the operations within any given set is the same as the order in which the operations appear. In set 700 of FIG. 7, the insert command 730 occurs before write command 740, which occurs before write command 750, and this order is therefore respected. In addition, there is also an ordering between sets. In some embodiments, the set identifier incorporates a timestamp from a global clock in order to ensure the proper ordering of sets. This timestamp can be combined with a UUID and/or sequence number in order to form the set identifier. The UUID could be a client ID, or an ID for a unit of work being managed in the overall system of computation. In this way, a set identifier that is received from a client can be received as an explicit identifier or can be constructed from information obtained from the client. All that is necessary is that the set identifier be unambiguously identifiable.

It can be helpful for failure recovery to have clients create the set identifiers themselves. A set of operations should be applied exactly once, and certain failures may make it hard to know whether a set of operations has been completed. Failure recovery is often handled by retransmitting the same information, but this has at-least-once semantics (if the original attempt succeeded, but the failure occurred somewhere along the path of notifying the client of this outcome, the retransmission is redundant and could cause the same operations to be applied more than once). An identifier selected by the client could be reused for the retransmission, which can help avoid more than one application of the same set of operations.

As previously explained, the write commands 740, 750 in set 700 must be associated with one or more payload records 660 specifying the actual location of the data for that write commands 740, 750 in the file data array 410 for this file 500. In some instances, multiple write commands 630 can exist within a single set, as is the case of set 700. For purposes of forming and maintaining this association, all modifying operations included in a given set that carry payload data (just the "write" commands 630 in the currently described embodiment) can be treated as having a single merged payload. In set 700, the modifying operations including one write 740 of length 700 and another write 750 of length 300 (and no other write operation). Consequently, this set 700 is associated with total payload data of length 700+300, or 1,000. The payload record 760 is therefore the merged payload for both write commands 740, 750, and has a length of 1000. This payload record 760 is associated with set 700 by referencing set identifier "γ" (the set identifier for set 700). The payload record 760 further includes the offset and length of the payload data on the file X file data array 410, and also an identifier for that array 410. Because the data for that payload record 760 was written to the file data array 410 in an append-only fashion, it can be assured that the data is stored on the file data array 410 in a contiguous fashion, starting at offset 0 and proceeding for 1000 units.

As explained above, it is possible (and even expected) that the operations for set 700 will be placed onto the file X metadata array 400 before the payload record 760. In order for the set 700 to be considered "complete," all payload data must be accounted for by having the payload data stored on the file data array 410 and a payload record 760 for the correct set identifier γ placed on the metadata array 400. In other embodiments, payloads are not merged for payload-requiring operations. This would mean that two separate payload records 660 would be placed in the metadata array 400 for set 700. It is also possible that a single write operation will be related to more than one payload. The only real requirement is that the total amount of payload data referenced in a given set be accounted for in some number of payload records which carry the given set ID.

As explained above, changes to file X are persisted in both systems 10 and 20 through append operations to the file X metadata array 400 and the file X file data array 410. In other words, the only thing that is stored are sets of modifying operations 600 and the associated payload records 660 on the metadata array 400 and data on the file data array 410. Ideally, all sets of modifying operations found on the metadata array 400 are complete, meaning the entire set of modifying operations have been recorded (including the start 680 and end 690 operations) and all payload data referenced has had a location in the file data array 410 recorded through a payload record 660. However, it is possible for any given set to be incomplete if either of these conditions does not hold, either transiently or permanently.

It is possible to update the location of payload data on the file data array 410 by appending a record to the metadata array 400. This could allow the actual file data to be moved to another data array. This could also allow the file data array 410 to be altered (such as through a compaction operation).

Since file data array 410 is an append-only array 130, it is modified only through append operations. This means that new data that replaces old data is appended onto the end of the array 310 without any attempt to delete the old data. While this can be very helpful in the context of reversion and for efficient write performance, it can lead to much wasted space as old, outdated data is retained within the file data array 410. Compaction allows the system 10, 20 to reduce the size of a file data array 134 by discarding no longer needed data, or to increase the efficiency of data access by reordering the data it contains. This could also happen when rebuilding a lost redundancy, or through the implementation of RAID, or when migrating data between machines or across tiers. In fact, compaction is effectively accomplished for "free" when data is moved across tiers as significant portions of the entire array will need to be rewritten anyway to accomplish the movement to a new tier. It is also possible to compact the metadata array 400, which discards no longer needed records, coalesces a sequence of similar modifying operations, and/or consolidates related information into fewer records. Such modifications could even involve a limited reordering of records, but any such reordering must, by necessity, preserve the sequence of modifying operations within a set and also the sequence of such sets. Note that it may make sense to move from replication redundancy to RAID redundancy, either at the point when the file data array 410 moves across tiers or when enough data has accumulated in a given tier. This could be handled through the compaction and consolidation steps. Finally, it is possible to create compact summary records when a large amount of metadata has been accumulated. These summary records are primarily useful when the criteria to be applied in the context of a read request can be predicted in advance. The summary records would essentially represent the virtual file array as it would exist at that point in the sequence of metadata records, under the predicted criteria.

Reversion

Figure 8:
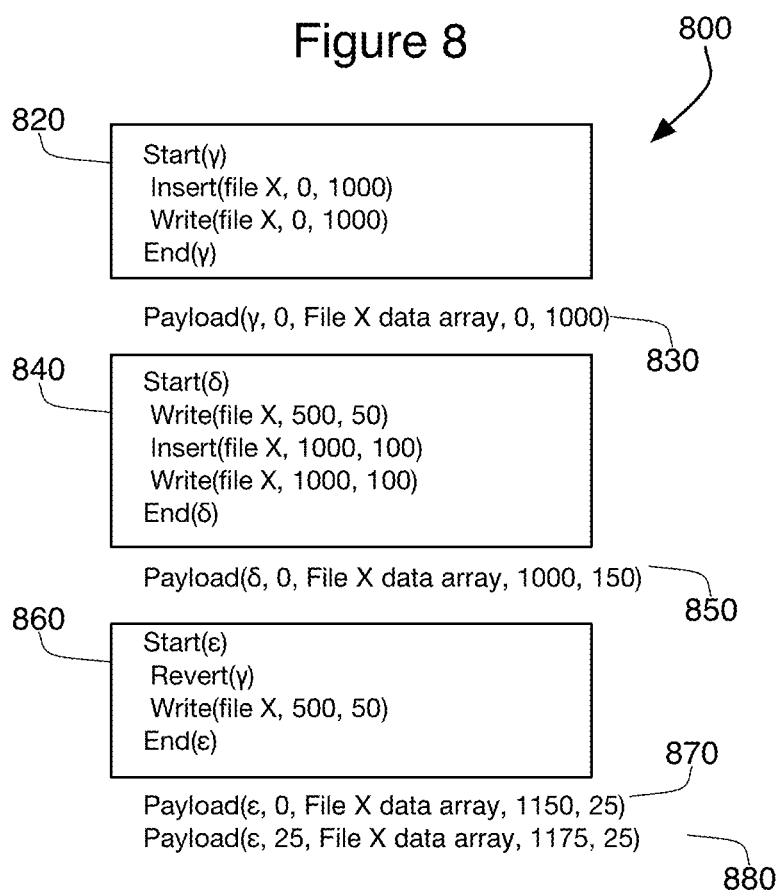
FIG. 8 is a schematic illustration of three modifying operation sets and related payload records.

FIG. 8 shows a plurality 800 of operations 600 that may that be found on the metadata array 400 for file X. These operations 800 have been grouped into three sets, namely set 820 (with a set identifier of "γ"), set 840 ("δ"), and set 860 ("ε"). The first set is similar to set 700, except that it contains only a single write command. This set opens a hole having a length of 1,000 at the beginning of file X 500, and then writes data into that hole. The data is specified by payload record 830, which specifies that this payload data is found on the file X file data array 410 starting at offset 0 and extending for a length of 1,000.

The second set or group of modifying operations is set 840, identified by the delta identifier. In this set 840, a first write command writes 50 units of data in file X 500 starting at offset 500. This effectively overwrites some of the data previously stored in file X 500 by set 820. The insert command then insert a hole of size 100 at offset 1,000. The second write command in set 840 then writes data into this newly created hole. The payload record 850 for this set 150 contains the merged data of 150 units for both write operations in set 840.

The third set 860 of modification commands starts with a revert command. Revert commands 650 contain only a single parameter, namely the identifier of the set to which the file should be reverted. In this case, the identifier indicates that the file should be reverted to its state as of the gamma (γ) set 820. This means that the file 500 will be reverted back to the state before set 840 was applied. Note that the operations of set 840 and the payload record 850 still exist in the file x metadata array 400, while the data identified by payload record 850 still exists in the file X file data array 410. The reversion caused by the revert command is only implemented in the context of read-like operations, as are explained below. The next operation in set 860 is to write 50 units of data to file X 500 at offset 500. In this case, the payload for this write command is identified by two different payload records 870 and 880. The first half of the payload is specified by the first payload record 870. The second record 880 indicates that the portion of the payload beginning at offset 25 (the second half) can be found on the file data array 410 at offset 1175.

With the illustrated set of modifying operations set forth in FIG. 6, the first use of a new file will create it. The file can only be deleted in some type of compaction after it is known to no longer be of interest. For example, a given file may have been truncated to length zero by a delete operation of the entire file. This would not automatically remove the file from the file system, meaning that the related append-only arrays would remain. However, if it is known that operations before the delete operation may all be discarded, the related arrays can be erased during a compaction process.

Other types of modifying operations are possible other than those listed in FIG. 6. For instance, it may be desirable to add a modifying operation that swaps or exchanges two files. While this could be done with a grouping of two sets of Insert/Copy/Delete operations, a single modifying command could be added for performing this function. This would, in effect, have the file system act as if the labels "File A" and "File B" are exchanged. This could be useful when working with multiple virtual file arrays.

Multiple Files Managed by a Single Metadata Array

Figure 9:
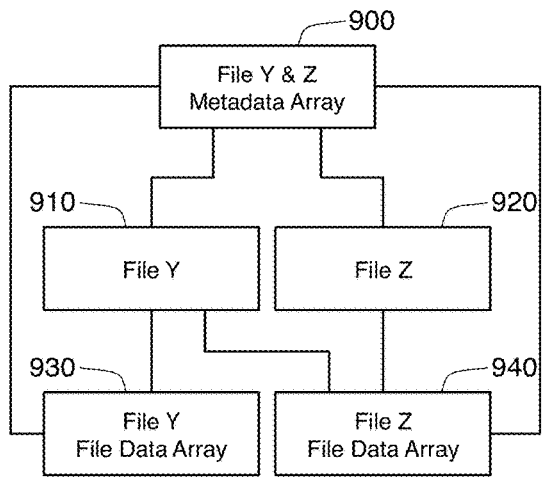
FIG. 9 is a schematic view of an alternative embodiment identifying the relationships or associates between files, a metadata array, and file data arrays.

As explained above, database systems may use multiple, related files to maintain database data, and such systems may find it advantageous, for example, to use one metadata array 132 to manage data for two separate but related files using two different file data arrays 134. A first file in the example system would be the main file used by the database, while the second file would be a journal file to track data that has not yet been added to the main file. This type of relationship can be seen in FIG. 9, which shows a single metadata array 900 being used for both file Y 910 and file Z 920. File Y 910 is associated with file data array 930 and metadata array 900. Similarly, file Z 920 is associated with a file data array 940 and only metadata array 900. But metadata array 900 tracks changes to both file Y 910 and file Z 920, and therefore is associated with both file data array 930 and file data array 940. Note that other relationships are also possible, such as a single metadata array 132 being associated with three or more files and file data arrays 134, or a single real data array shared by file Y and file Z. FIG. 9 also shows a relationship between file Y 910 and the file data array for file Z 940, which is explained below.

Figure 10:
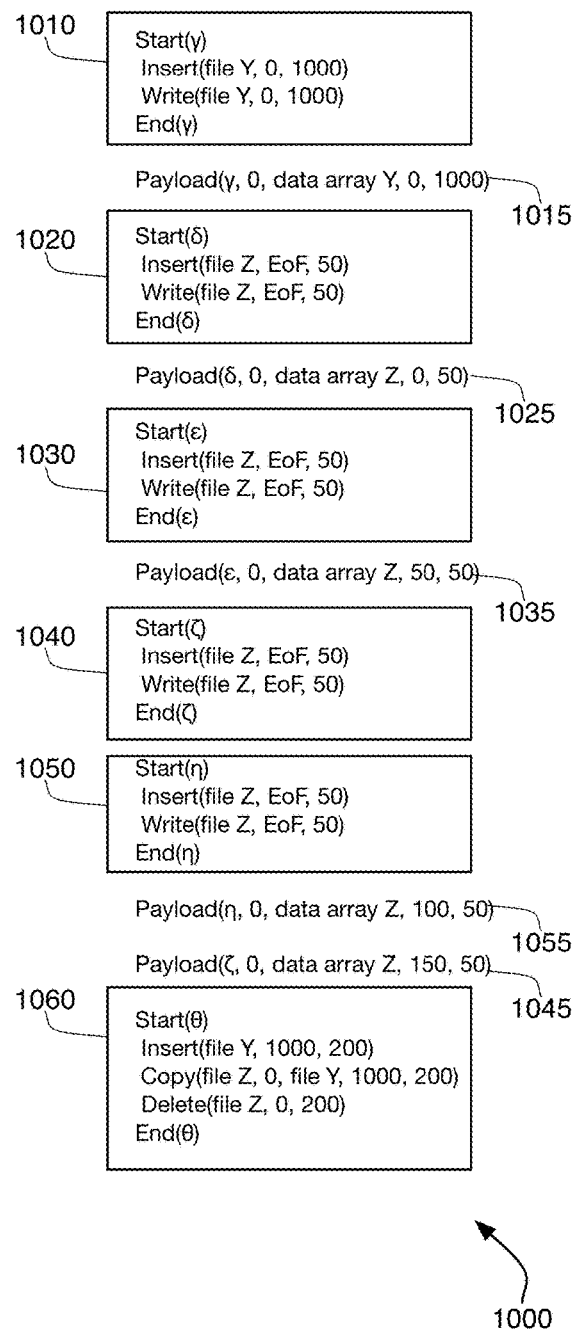
FIG. 10 is a schematic illustration of six modifying operation sets and related payload records.

A series of operations 1000 shown in FIG. 10 exemplifies how the present invention could be used in the context of the relationship shown in FIG. 9. The first operation set 1010 inserts a 1000 units hole in file Y 910 and then writes data into that location. Payload record 1015 indicates that this data was stored in data array Y 930 at offset 0. The second and third operation sets 1020, 1030 each insert and store 50 units of data into file Z 920, and the payload records 1025, 1035 indicate that the real data was stored at in data array Z 940 at offsets 0 and 50, respectively. Note that even though these sets 1010, 1020, 1030 relate to two different files 910, 920, with real data stored in two different file data arrays 930, 940, the modification records for these commands will be stored on a single metadata array 900.

The next two sets of modifying operations 1040, 1050 and also store 50 units of data at the end of file Z 920. However, the payload records 1045, 1055 for these indicate that the payload data was recorded out-of-order. By allowing payload data to be recorded to the file data array 940 in the order received (even if it is out-of-order in the context of the metadata array 900), the data can be processed much quicker and more efficiently. Even the payload records 1055, 1045 are recorded out-of-order, these records 1055, 1045 properly refer to the respective modification sets 1050, 1040 using the set identifiers, so there is no possibility of confusion and the system 10 has no trouble matching the payload data to the modifying instructions when it comes time to read out the data.

The final set 1060 of modifying operations shown in FIG. 10 shows how the main database file Y 910 is updated. First, a hole is inserted into file Y 910, and then data from file Z 920 is copied into the new hole in file Y 910. Finally, the data in file Z 920 (added through modifying sets 1020-1050) is deleted. Note that the copy command 640 does not require any payload data. The copying is done solely through the copy record appended to the metadata array 900 which identifies the data already stored in the File Z file data array 940.

Note that after set 1060, file Y now contains real data that is found both in the file Y file data array 930 and the file Z file data array 940. As shown in FIG. 9, an additional relationship line is shown between file Y 910 and the file Z file data array 940 to reflect this fact.

ACID

The acronym ACID is used frequently in the context of transaction processing, and it refers to Atomicity, Consistency, Isolation, and Durability. Storage is all about durability (persistence/permanence), but the present invention provides applications other capabilities that support the "A", "C", and "I" properties of ACID. Atomicity is provided through the ability to group modifying operations into the sets of operations described above. A set of operations is not considered complete until the entire set is recorded and the required payload record (if any) is also recorded. An incomplete set would not be considered to have altered the data in the file, thus guaranteeing atomicity. Similarly, isolation and consistency can be maintained through the ability to serialize groups. One set of modifying operations can be explicitly made dependent on the completion of previous sets of operations. This is made possible, for example, in an embodiment where the start command that begins a group includes a dependence parameter which indicates which preceding set of instructions must be completed before this set of instructions can also be considered complete.

The append-only nature of all updates, together with this atomicity guarantee and strong support for fault-tolerance, work together to provide a property known as Stable Storage. This invention is very well suited when loss of any data is highly undesirable. It provides Stable Storage with no additional cost or complexity.

When guarantees are implemented for the consistency and isolation requirements of ACID, there can only be at most one set of modifying operations which has not completed. Because additional sets will depend on the completion of the prior sets, no additional sets of modifying operations will be included into the metadata array 400 for file X until the previous set is completed. This trades a more restrictive set of constraints around completions and serialization for stronger guarantees. When a single client is performing all modifying operations, the cost for the stronger guarantees can be very low. However, these guarantees do not need to be implemented. The present invention efficiently supports a variety of use cases, but it does not dictate that applications be written in particular ways.

It would be possible to coordinate distributed transactions that involve external participants or additional metadata arrays. To do this, a two-phase commit and writing commit (end group) and abort records would be used. This would also require the use of a prepare record.

Alternatively, an acyclic connected graph of dependencies (a tree) may be used instead of a single series of dependencies. This allows branching and more parallelism, but isolation and consistency are then only guaranteed along the sets linked by a chain of dependencies.

Non-Modifying Operations

Figure 11:
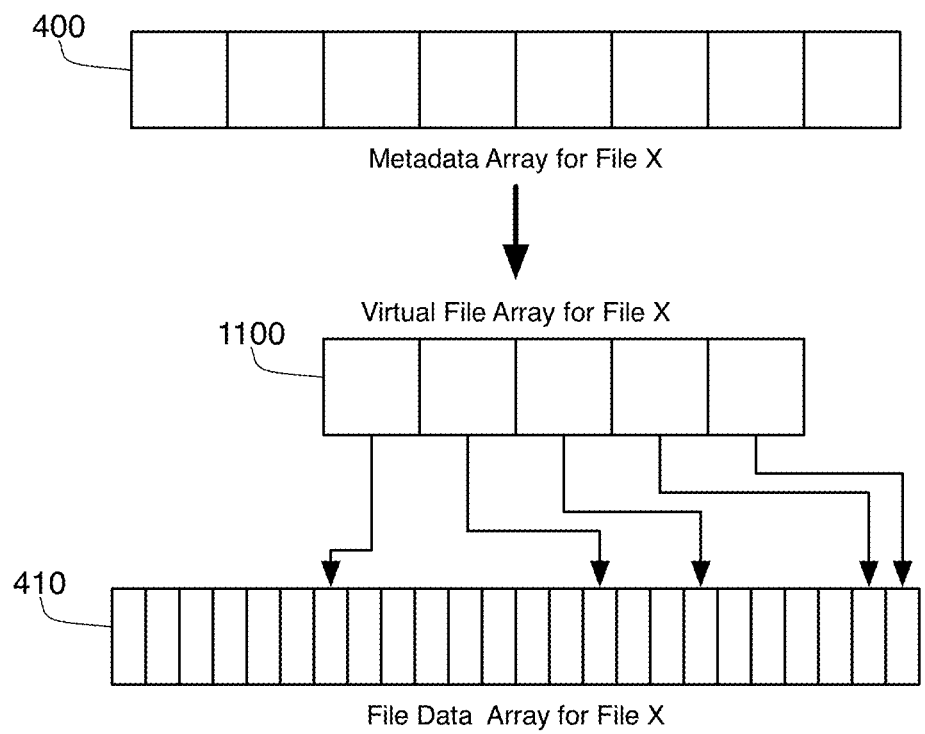
FIG. 11 is a schematic view of a virtual file array for file X and the relationship between the virtual file array and both the metadata array for file X and the file data array for that file.

By definition, any read-like (non-modifying) operation will not alter either the metadata array 132 for a file or the file data array 134 for that file. Instead, a read-like operations will start by reading information from the metadata array 132, such as metadata array 400 for file X. In the preferred embodiment, the metadata array 400 will ideally be cached in DRAM at the metadata storage location 120 (or at least kept or cached in a hotter tier, such as SSD). As shown in FIG. 11, the metadata array 400 for file X is read for the purpose of creating a virtual file array 1100. If multiple files are associated with a metadata array, such as in the context of metadata array 900, a separate virtual file array would be created for each associated file (file Y 910 and file Z 920 would each have their own virtual array).

Virtual file array 1100 is created by starting at the beginning of the metadata array 400 and applying the modifying operations of all relevant sets in order. As explained below, filtering and snapshot processing can refine the relevant sets for a particular read-like operation. The order will generally follow the order of the records in the metadata array 400. All operation records within a set will be performed in the order in which they are recorded. Individual sets of modifying operations can be ordered based on the set IDs or other criteria, and revision can also alter this ordering. As explained above, set identifiers can include a universal timestamp. In one embodiment, this timestamp is used to sort the modifying operation sets rather than having to rely solely upon the order of recordation of each set in the array 400. Note that this allows some direct manipulation of a file by creating a false timestamp for a modifying operation set that makes the operations of the set be performed earlier in time than when the operation set was actually received by the storage app 110 (or even earlier than when transmitted by the client 160). By going through each modifying operation set in order, reversions such as that shown in FIG. 8 are possible. Once the metadata array 400 has been processed, the resulting virtual file array 1100 identifies the content of the file.

Virtual array 1100 is created to have the same length as file X 500. Note that this is not the same length as either metadata array 400 (which contains the append-only list of modifying operations and payload records for file X 500)

nor is the virtual array 1100 the same length as the real data in file data array 410 (which includes all superseded and otherwise deleted data that file X 500 once contained). In addition, as explained above, a file such as File Y 910 may contain real data found in two or more different file data arrays 930, 940. The virtual array for file Y 910 would nonetheless be a single array that is not equal in length to either of the file data arrays 930, 940 that contain its data.

Although virtual array 1100 is the same length as file X 500, it does not contain the actual real data for that file 500. Rather, the virtual array 1100 virtually contains this data by mapping to the array locations where the file data is actually stored in the file data array 410. This means that the virtual file array 1100 may not even have the same length as all of the mapped-to data in the file data array 410. This is because some embodiments will store the data in the file data array 410 in a compressed format. Assuming a 1.25 compression ratio, the size of the virtual file array 1100 will be 25% larger than the actual storage used for the data comprising the file 500. Other types of real data processing or transformation could also be performed on the data, such as encrypting all data stored in the file data array 410, which leads to a disconnect between the real data referenced in the virtual array 1100 and the actual data stored in the file data array 410. One of the useful benefits of the disclosed embodiments is that the actual data can be stored nearly anywhere, can recorded asynchronously, and can have various data operations applied to it, such as encryption, compression, or signing.

It should be understood that virtual array 1100 will typically be represented in memory as a description. For example, the virtual array 1100 might be a mapping which takes the form of a series of descriptors that contain information on the starting offset and length in the virtual array, plus location information that identifies where to locate the data, which would identify a particular real data array and include an offset and length. In this context, the virtual array description found in memory may not look much like an array and may have a very different length than that of the actual virtual array.

Filtering

All read-like operations have a context. Specifically, they need to know which sets of modifying operations from the metadata array 400 to include in the virtual file array 1100 and in what order the sets are to be processed. The most obvious context is to include all modifying operation sets in the metadata array 400 that have completed. Any set which has not completed will be ignored (be invisible) in order to provide the atomicity guarantee. Of course, all sets ideally complete reasonably quickly and only sets that were started very recently should not be completed.

Failure to complete a set likely stems from some sort of failure elsewhere, and it is good to provide means of recovery from any such failures. One mechanism for doing this is the ability to cancel (or "abort") a set of atomic operations before they have completed. For this reason, the ability to identify any sets that have not completed, and then to abort a given set is provided in most embodiments of the present invention. The API provides this capability, which allows the ability to inform the client 160 that a set of modifying operations may need to be cancelled. Completing a set of modifying operations is preferable to cancelling such a set, but this requires the help of a higher level process. If completion does not happen naturally, cancellation is normally the only recourse—along with higher level recovery, as appropriate.

During any read-like operation, any sets of modifying operations that have not completed are ignored. This effectively creates a filter that skips any uncompleted sets when reading and processing the metadata array 400 in order to create the virtual file array 1100. After applying this filter, the "context" for the creation of the virtual file array 1100 will be all of the completed modifying operations sets performed on file X 500.

It is also possible to apply specific filter criteria beyond filtering incomplete operation sets. For example, if set identifiers include the client which initiated the set, it would be possible to filter out sets initiated by a particular client.

Snapshots and Cursor

Data backup systems frequently discuss data "snapshots," which define the data in a file or storage system at a particular point in time. A snapshot is a view onto the storage as it existed at that prior point in time. Most backup systems allow the ability to restore data devices or virtual storage to their state as of the moment of that snapshot.

In the language of snapshots, each set of modifying operations described above can be considered to define a separate snapshot of a single file in a series of snapshots. The initial element in the series is empty, as no modifying operations have occurred. The final element in the series defines the most recent snapshot and includes all (filtered) sets of modifying operations. Any elements in the series between these two represent snapshots at each point along the way between these two endpoints.

Figure 12:
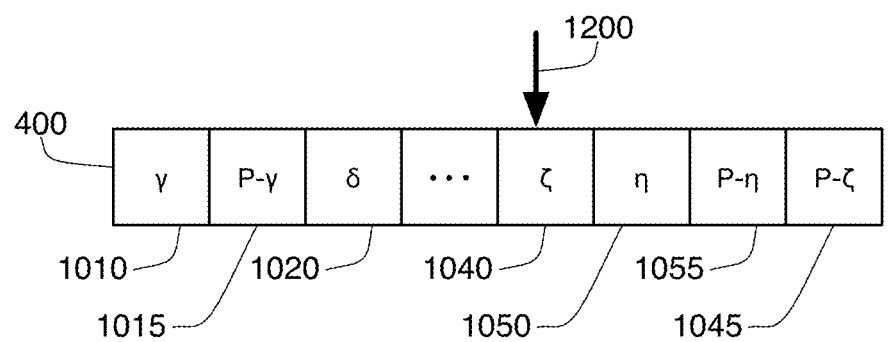
FIG. 12 is a schematic view of the metadata array identifying modifying operation set identifiers, payload records, and a cursor.

One conceptualization of these different snapshots utilizes a cursor 1200 identifying locations in the metadata array 400 as shown in FIG. 12. FIG. 12 shows metadata array 400 containing the modifying operation sets identified in FIG. 10, with "P-" representing the payload record for the identified set. In FIG. 12, the cursor positioned at the location of the zeta ($\zeta$) modifying set 1040. If the virtual file array 1100 is created with the cursor 1200 in this location, a snapshot of File X 500 will be created through the time period of the zeta set 1040, but not including the eta ($\eta$) modifying set 1050. Thus, the process for creating the virtual array 1100 for file X 500 will analyze the metadata array 400 starting at the beginning (set 1010) through to the zeta set 1040. This sequence of modifying sets forms the context for read-like operations that will examine file X 500 as of this moment—this snapshot. It includes not only the actual modifying operations that appear before the cursor 1200 location in the metadata array 400, but also will include any payload data for included modifications even if they payload records arrived after the cursor location 1200. In this case, the payload for the zeta set 1045 occurs later and is therefore to the right of the cursor 1200 in FIG. 12. Nonetheless, this payload record 1045 is included when created the virtual array 1100 for file X 500 using this snapshot.

For an application such as a source control system, it may make sense to be able to efficiently determine differences between two different cursor locations (snapshots). For this reason, an API surface to allow reading metadata records may be useful. This could allow reading records between two points in a sequence, or perhaps even reading out aggregated differences between two such points. Another use for such an API is to help clients that may be caching read information. These clients can read the records between two cursor locations to catch up to the current data state without having to reread all of the file's data. The ability is another unique feature of the present invention. This part of an overall API for read-like operations is optional; all essential read-like operations only expose the virtual projections (through virtual file arrays 1100) of files as of a given snapshot.

Figure 13:
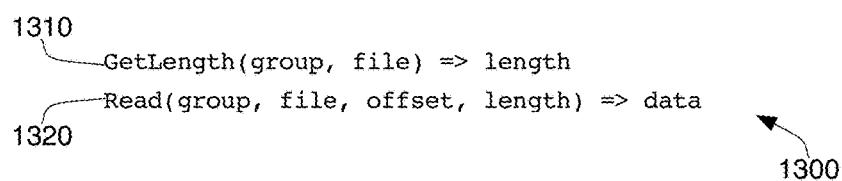
FIG. 13 is a list of read-like records/operations.

In one embodiment of the API, the read-like operations contain only two separate operations 1300, which are shown in FIG. 13. This includes the GetLength operation 1310 and the Read 1320 operation. In one embodiment, both operations 1300 take a group identifier as the first parameter, which identifies the location of cursor 1200. As just explained, this location defines a snapshot in which the group identified by this parameter is the last included modifying set. If the group identifier is omitted, the system would read to the latest completed snapshot (the latest complete modifying record set) for the file. Both read-like operations 1300 also include a file parameter to identify the file (such as file X 500, file Y 910, or file Z 920).

These are the only two parameters for getLength 1310, which simply responds with the length of the identified file. This length can be determined only after the virtual array (such as array 1100) has been created for the file.

The read operation 1320 also identifies the offset and length of the data to be read from the file. In the context of file X 500, a read operation 1320 causes the creation of virtual array 1100. The offset in the file identified by the offset parameter will define the offset into the virtual array 1100. The length of the data to be read will be equivalent to the length of data read from the virtual array 1100. The actual data that will be returned in response to the read operation 1320 will be acquired from the file data array(s) 410 based on the mapping in the virtual array 1100.

Fault Tolerance

Fault tolerance is, of course, of utmost importance to maintain the durability/persistence of data stored in system 10. When object storage 100 is used, the easiest technique for providing durability is through replication (while also applying principles from RAID as appropriate). The actual implementation depends upon the number of overlapping failures to be tolerated.

If the number of failures that must be tolerated is zero, nothing has to be replicated. Using RAID 0 (striping) on the arrays 130 could be useful, in that it allows more capacity and more I/O bandwidth by bringing multiple servers to bear on behalf of a single file. In this case, the overall base data array is pieced together from and backed by the data arrays of multiple files, as exposed by individual object storage servers. Without replication, one object storage server is the home of the aggregated object storage object and holds any metadata that is not part of the metadata which individual object storage servers maintain for each of their files anyway (such as the list of sectors backing the data array). Access to this metadata is through the home server, and access to the data ultimately is handled by the stripe of servers (either through the home server or directly from clients).

The next step up is being able to tolerate a single failure. This means keeping two copies of everything or using RAID 5 (parity). It normally makes sense to replicate metadata, and to use RAID 5 when writing larger amounts of data. For smaller amounts, keeping two replicated copies often makes sense. Tiering provides an opportunity to transform a series of small writes into larger ones, at the point data moves between tiers. Replication potentially means that DRAM can actually become the first tier, which is very significant. In other words, if data has made it into DRAM on two independent servers, it can survive loss of one server. DRAM is so much faster than even SDD that this is very significant. In addition, data may be written to DRAM at byte granularity, not at whole-sector granularity, which can also be very significant. Without this capability, small writes have to be handled by reading in a sector, adding or overwriting an amount of data less than a sector, and then writing the updated sector back out—or else small amounts of data are written to a new sectors, wasting the remainder of these sectors, and metadata must track how the data is spread out. For small amounts of data, this metadata could be a significant source of overhead, on top of wasted space within any partially filled sectors. Similar issues come up with small writes and RAID.

Technologies such as non-volatile dual in-line memory module (or NVDIMM) or 3D XPoint (from Intel Corporation, Santa Clara, Calif.) provide byte granularity, along with persistence in scenarios where DRAM is not persistent. These technologies can be used when there is no replication, and they may also be desirable even with replication.

If a failure occurs, the goal is to reconstruct lost redundancy (replication or RAID) before a second failure occurs. So long as this happens, a series of failures will not result in data loss. However, it is possible to tolerate more than one failure that overlap in time. Keeping three copies of metadata (and data for small writes) and using RAID 6 in place of RAID 5 means two concurrent failures can be tolerated. The idea is to provide the same file data array 134 and metadata array 132 as in the case with no fault tolerance, but with the addition of fault tolerance, extra capacity for very large files (since they now span servers), and higher I/O bandwidth (again, multiple servers). Adding in DRAM provides even more benefits. The cost is additional complexity, plus writes must now interact with more than a single server. This means they may have to wait for the slower of two servers (which is more than offset by the speed of DRAM).

Merged Metadata Array

Figure 14:
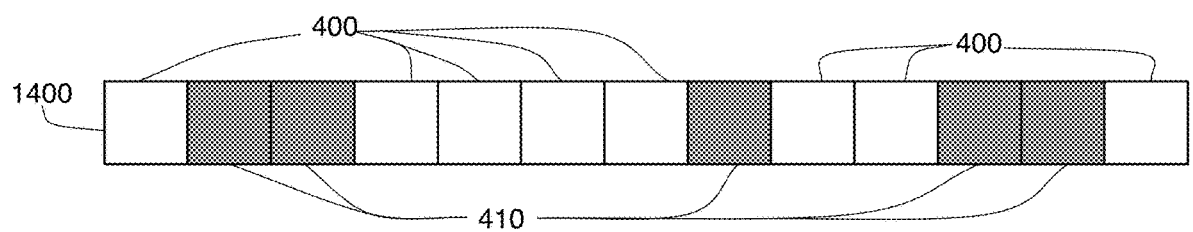
FIG. 14 is a schematic view of a merged metadata array and file data array in an alternative embodiment.

FIG. 14 shows an example of a merged append-only array 1400 in which the cells or records of the metadata array 400 for file X 500 are interleaved with the data (shown shaded) from the file data array 410. Such interleaving is possible in some embodiments of the present invention, but this type of merged array 1400 would normally require a larger number of potential operations. In a merged array 1400, the write process is relatively straight-forward. Calls received through the API would be converted into metadata records and real data, both of which would be simply appended onto the merged array 1400. The read process is slightly more complicated, as all of the metadata would need to be read from the merged array 1400 before the virtual array could be created for the file. The virtual array would then point to locations in the merged array that contains the real file data. In this context, it would be preferred to read the entire merged array 1400 into memory in order to avoid re-reading the same file to access the read data for the file.

In the context of a particular storage device (e.g. SSD or HDD), it becomes possible to reference data locations via a sector and offset or a device-relative offset. Thus, a range in an append-only array becomes a range of sectors, list of sectors, or a device-relative offset, plus an initial offset and a length. This provides an alternative means of referencing locations from a metadata array in any associated data array which is persisted on the same storage device. Such a data array can be referenced without the need for an independent list of sectors or mapping from array offset to offset on the storage device. In other words, the need to translate a range in a given data array into a list of sector/offset plus length pairs can be incorporated into the metadata array. This may also be extended across devices managed by the same computer. This can reduce the number of storage locations which must be accessed in order to access data.

A similar alternative embodiment also stores real data and metadata 1400 in an append-only array 1400, but only when the amount of data is small. For example, if the amount of data comprises less information than is required to reference a location in a separate file data array, it is possible to include the actual data inside a payload record. Thus, rather than the payload record referencing a location in the file data array, the payload record contains the actual data.

System 1500 and Methods

Figure 15:
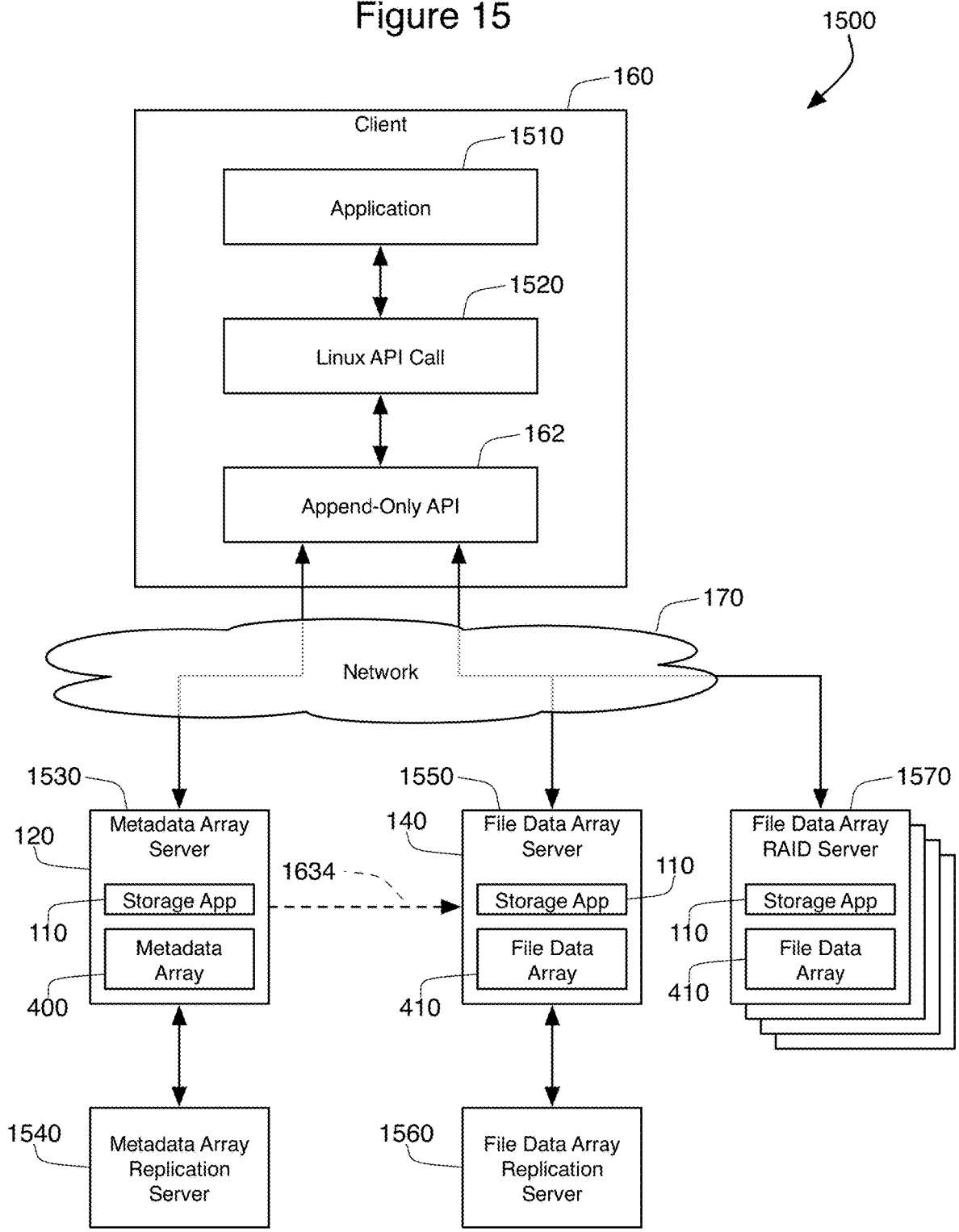
FIG. 15 is a schematic view of a third system for implementing the present invention.

FIG. 15 shows another embodiment system 1500, which will be used to discuss modification operation method 1600 (shown in FIG. 16) and read-like operation method 1700 (shown in FIG. 17). System 1500 is similar to system 10, in that a client 160 uses API 162 of the present invention to communicate over a network 170 to store and read metadata and real data. Client 160 is shown as having an application program 1510 that is operating on a computer processor. The application 1510 wishes to interact with a file stored on the overall system 1500. However, rather than requiring the application 1510 to be rewritten to communicate using the append-only API, the application 1510 merely uses the file-based API 1520 provided by the operating system of the computer. If the operating system is Linux, the application 1510 communicates using Linux API calls. To write to a file in Linux, the application might use the following commands:

```
open("file X", write_mode) => fd1
write(fd1, "some data", sizeof("some data"))
write(fd1, "more data", sizeof("more data"))
close(fd1) => OK
```

The first command opens file X, which would cause the receipt of a file descriptor "fd1." This file descriptor would then be used to write "some data" and "more data" to the file, and then the file descriptor is used to close the file.

Method 1600

Figure 16:
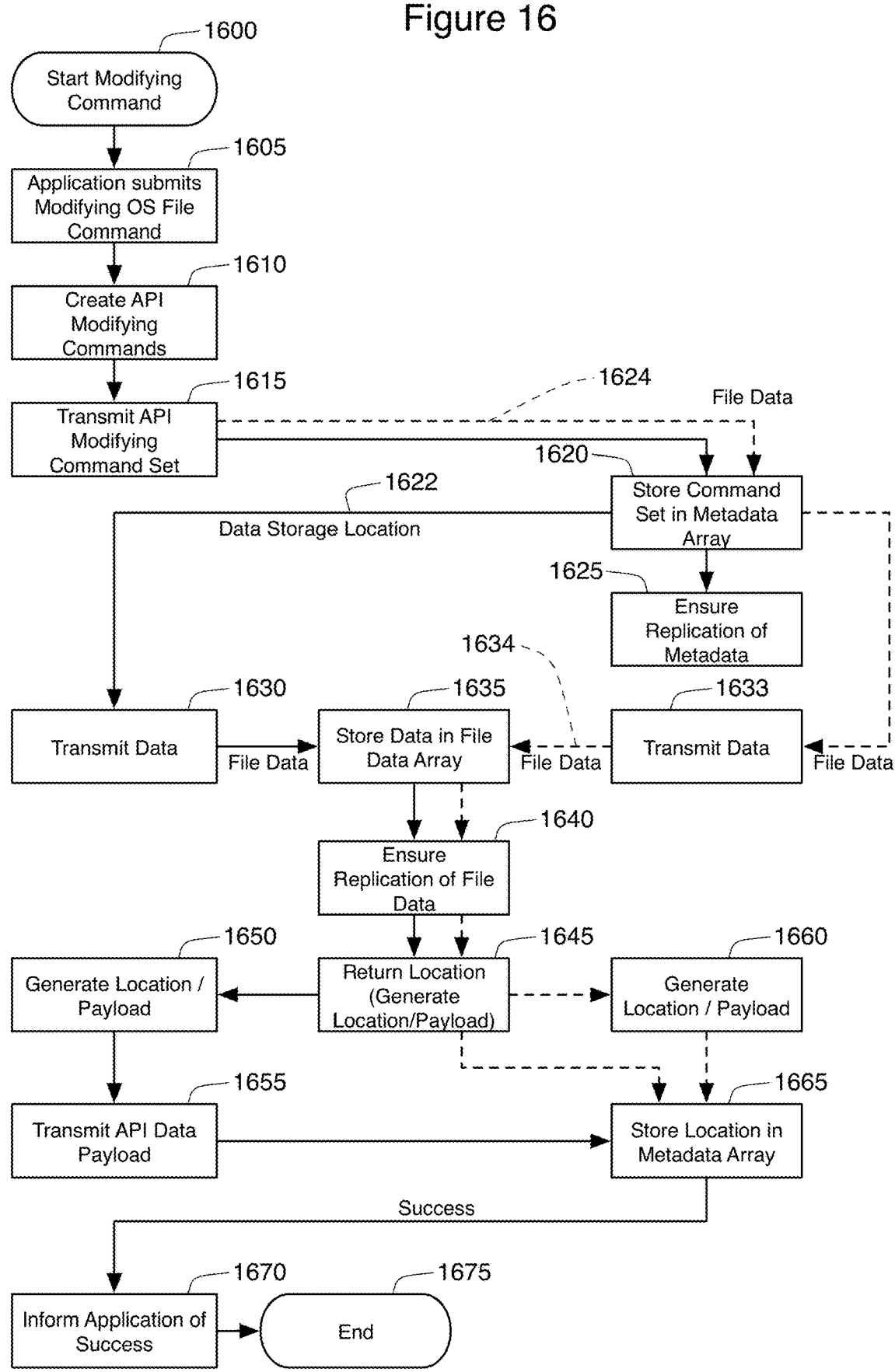
FIG. 16 is a flow chart showing a process for implementing a modifying command.

The application submitting the modifying commands to the client operating system constitutes the first step 1605 of the modifying command process 1600 shown in FIG. 16. In FIG. 16, the various steps of method 1600 are divided into columns, with the left-most column occurring at the client 160, the right-most column occurring at the location where the metadata array 400 is maintained, and the center column occurring at the location where the file data array 410 is maintained. These locations may all coexist on the same physical machine, they may exist on two or three different machines, or a single one of the columns in FIG. 16 may be performed on multiple physical machines. The various steps at the client 160 are performed by the "API" 162, which includes not only the command interface protocol but programming on the client 160 which is responsible for performed the steps outlined below. The steps performed by the metadata array server 1530 and the file data array server 1550 are performed by the storage app 110, which is simply programming at these computer systems that is responsible for performing these steps.

After the application submits the above file requests, it is then necessary to convert these requests into operations for the append-only API 162 in step 1610. The client computer first identifies the full path and name for "file X," which is accomplished in the usual manner under Linux. This would identify the metadata array server 1530 which is handling the metadata array 400 for file X as well as an ID for the metadata. In cases where the metadata array 132 manages multiple files, such as metadata array 900, this identification would include a small integer file number that identifies a particular one of the files being managed by the metadata array 132. The metadata array server 1530 is, effectively, the metadata storage location 120 of FIG. 1. As explained above, API 162 is a wire-level RPC interface that accepts certain modifying commands when set forth in identifiable sets. A set identifier is created that includes a universal time stamp and UUID (and perhaps a sequence number for use by the client and application). The set identifier is then used to create the following modification commands for the metadata array server:

```
Start(γ)
    Insert(file X, 0, sizeof("some data" + "more data"))
    Write(file X, 0, sizeof("some data" + "more data"))
End(γ)
```

These commands are then transmitted to the metadata array server 1530 over the network 170 (step 1615).

At step 1620, this information is appended to the end of the metadata array 400 that is stored at the metadata array server 1530. The metadata array server 1530 will have knowledge about the location of the file data array 410 for this file X. As shown in FIG. 15, the file data array 410 is stored on file data array server 1550. In one embodiment, the metadata array server 1530 sends the location/identity of the file data array server 1550 back to the client 160, which is shown as communication 1622 in FIG. 16. In other embodiments, this communication is skipped.

The metadata array server 1530 is responsible for ensuring fault tolerance, and therefore instructs another server, namely the metadata array replication server 1540 to also append this same information to the end of a duplicate copy of the metadata array 400. This occurs at step 1625.

If communication 1622 sends the location of the file data array server 1550 to the client 160, the client is then responsible for submitting the actual read data to the file data array server 1550. This is submitted in the form of the RPC for the API as follows:

```
Data(file-X-data-array-ID, "some data" + "more data",
    sizeof("some data" + "more data"))
```

This data command is sent from the client 160 to the data storage location 140, which in this case is the file data array server 1550 identified in communication 1622. This is step 1630 in FIG. 16.

If communication 1622 is not sent, the client 160 is not aware of the location of the file data array 410. In the context, the client 160 simply transmits the data( ) operation directly the metadata array server 1530. This is shown as the dotted-line communication 1624 that parallels the original transmission of the modifying operation set from the client 160 to the metadata array server 1530. This data operation is not part of the modifying operation set but can be sent immediately afterward along the same data path. In this embodiment, the metadata array server 1530 is responsible for transmitting the data to the file data array server 1550, which is shown as communication 1634 in both FIGS. 15 and 16.

At step 1635, the file data array server 1550 appends the real data to the end of the file data array 410 at step 1635. The file data array server 1550 is responsible for ensuring fault tolerance for the real data, so this same real data is transmitted to the file data array replication server 1560 at step 1640. This replication server 1560 maintains a live copy of the file data array 410 to protect against data loss. The offset location of the stored data and its length are then returned by the file data array server 1550 to the source of the real data, which is either the client 160 or the metadata array server 1530. This occurs at step 1645.

If the data offset location is returned to the client 160, it is responsible for generated a payload record at step 1650 and then transmitting that operation at the metadata array server 1530 at step 1655. This record will be as follows:

Payload(γ, 0, file-X-data-array, offset location,
sizeof("some data" + "more data"))

If the file data array server 1550 returns the offset location to the metadata array server 1530 at step 1645, then the metadata array server 1530 will generate this payload record at step 1660. In a third embodiment, the file data array server 1550 can itself generate the payload record and send it directly to the metadata array server 1530 (the file data array server 1550 may have been informed of the identity/location of the metadata array server 1530 by the client 160 in order to send the payload record in this manner). Regardless of who generates the payload record, it is appended to the end of the metadata array 400 by the metadata array server 1530 at step 1665 (and replicated at the metadata array replication server 1540 in the same manner as step 1625). The success/completeness of this operation is then communicated back to the client 160 at step 1665, with the client 160 then information the application 1510 of this success at step 1670. The method 1600 then ends at step 1675.

In some embodiments, the file data array 410 is not stored on a single file data array server 1550, but on a RAID system 1570. This system would stripe the file data array server 1550 using a RAID 5 protocol (for example), thus achieving redundancy and while also increasing performance for reads and writes to the file data array server 1550. Other RAID systems (such as RAID 6) could also be used. In this embodiment, the client 160 can receive from the metadata array server 1530 a list of file data array locations/identifiers. The client 160 can then send data (and parity/erasure coding for RAID5/6) to the identified file data array servers 1570 in parallel.

Method 1700

FIG. 17 shows a method 1700 for implementing read-like operations 1300 using system 1500. The method 1700 starts by the application 1510 submitting a read-like commands to the operating system at step 1705. These commands might take the form of the following Linux requests:

open("file X", read_mode) => fd2
read(fd2, pointer_to_large_buffer, size_of_large_buffer)
    => size actually read
close(fd2)

The first open command opens file X in read mode and results in the return of the "fd2" file descriptor. The f2 descriptor is then used to identify the file for the read command which reads the file to a large buffer. The file is then closed. Note that it is also possible to include a getLength( ) command before the read( ) command in order to determine the necessary size of the buffer or the number of smaller buffers needed to perform the desired read.

At step 1710, API 162 is then responsible for converting this Linux read request into a read request for system 1500. The resulting command under API 16620 would read like the following:

read(file X, 0, size of large buffer)

This command is transmitted by the API programming 162 on the client 160 to the metadata array sever 1530 at step 1715.

At step 1720, the metadata array server 1530 identifies and reads the metadata array 400 for file X 500. After reading the metadata array 400, the metadata array server 1530 generates virtual file array 1100 at step 1725. As explained above, this step of creating virtual array 1100 might involve one or more of the following steps: filtering out non-complete modification sets, using a cursor position for the creation of a snapshot or otherwise selecting a subset of modification sets, and/or ordering of the relevant modification sets. Next, the metadata array server 1530 identifies the location/identity of the file data array server(s) 1550, 1570 that contain the relevant file data array(s) 410. This occurs at step 1730.

This location/identity information and the virtual array 1100 itself are then sent back to the client 160 along data path 1732. The client 160 is then able to formulate a request at step 1735 to read the actual data identified in the virtual array 1100 from the identified file data array 410. This request is then sent to the identified file data array server 1550. In other embodiments, the metadata array server 1530 does not send the location/identity information or the virtual array 1100 to the client, but instead forms the request to read the file data array 410 at step 1740 and then sends it to the file data array server 1550.

Regardless of where the request comes from, the file data array server 1550 (or the file data array RAID server 1570) reads the requested data identified from the virtual array 1100 from the file data array 410 at step 1745 and then returns that data at step 1750. The read data is returned either to the client 160 if the file data array server 1550 received the request from the client 160, or to the metadata array server 1530. If the data is returned directly to the client 160, the API programming 162 can return the requested data directly to the application 1510 at step 1755. If the read data is returned to the metadata array server 1530, then the metadata array server 1530 must first return that data to the client 160 at step 1760 before the API can provide the data to the application 1510. The method 1700 then ends at step 1765.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method comprising:
    a) receiving a first set of modifying operations comprising a first write operation request for a first file;
    b) appending a write record concerning the first write operation request to a metadata array, the write record including a first set identifier for the first set of modifying operations, the metadata array being append-only;
    c) receiving real file data for the first set identifier;
    d) appending the real file data to a file data array separate from the metadata array, the file data array being append-only;

e) after appending the write record to the metadata array, identifying an offset location for the real file data in the file data array;
f) appending the offset location and a length to the metadata array in a payload record, the payload record including the first set identifier;
g) receiving a read operation request for the first file;
h) reading first file records from the metadata array, including the write record, in response to receiving the read operation request;
i) constructing a virtual array for the first file based on the first file records read from the metadata array, the virtual array mapping to locations of the real file data in the file data array;
j) reading the real file data from the file data array locations mapped to by the virtual array; and
k) receiving a second set of modifying operations comprising a second write operation request for the first file, the second set of modifying operations being associated with a second set identifier that differs from the first set identifier.

2. The method of claim 1, wherein the metadata array is found on a metadata array server and the file data array is found on a file data array server, wherein the metadata array server and the file data array server are different computing machines.

3. The method of claim 2, wherein the read operation request is received from a client computing device, further wherein the virtual array and a location for the file data array are transmitted from the metadata array server to the client computing device, still further wherein the client computing device directly requests the file data array server to read the real file data from the file data array locations mapped to by the virtual array.

4. The method of claim 2, wherein the read operation request is received from a client computing device, further wherein the metadata array server uses a location for the file data array and the virtual array to directly request the file data array server to read the real file data from the file data array locations mapped to by the virtual array, further wherein the metadata array server transmits the read real file data to the client computing device.

5. The method of claim 1, wherein the metadata array comprises a plurality of sets of modifying operations, wherein the first file records read from the metadata array are filtered to exclude records forming part of an incomplete set of modifying operations, and further wherein a given set of modifying operations is considered complete when records for all modifying operations in the given set have been recorded to the metadata array and payload records have been recorded for all real file data written in the given set.

6. The method of claim 5, wherein the second set of modifying operations have an explicit dependency upon the first set of modifying operations being complete, wherein records for the second set of modifying operations are appended to the metadata array before the read operation request is received, further wherein the step of constructing the virtual array enforces the explicit dependency by ensuring that the first set of modifying operations is complete before applying the second set of modifying operations.

7. The method of claim 1, wherein the metadata array comprises a plurality of sets of modifying operations, wherein the first file records read from the metadata array in response to receiving the read operation request extend from a beginning of the metadata array to a cursor location identifying a snapshot set location.

8. A method comprising:
a) receiving a first write operation request for a first file including first real file data;
b) identifying a first set identifier for the first write operation request;
c) appending a first write record concerning the first write operation request to a metadata array, the metadata array being append-only;
d) appending the first real file data to a first file data array separate from the metadata array, the first file data array being append-only;
e) identifying a first offset location for the first real file data in the first file data array and identifying a first length for the first real file data;
f) appending the first offset location and the first length to the metadata array;
g) receiving a delete operation request to delete a specified portion of the first real file data from the first file, the delete operation request leaving a remaining portion of the first real file data in the first file, and the delete operation request being associated with a second set identifier;
h) recording the delete operation by appending a delete record to the metadata array without altering the first file data array,
i) after step h), receiving a first read operation request for the first file;
j) reading the metadata array including the first write record, the first payload record, and the delete record;
k) constructing a first virtual array for the first file having a first length equal to a file length for the first file as determined after the first write operation request and the delete operation request, wherein the first virtual array maps to the remaining portion of the first real file data for the first file in the first file data array; and
l) reading the real file data from the file data array locations mapped to by the virtual array.

9. The method of claim 8, wherein the first offset location and the first length are appended to the metadata array in a first payload record that includes the first set identifier.

10. The method of claim 8, wherein the first write record is saved in the metadata array so as to identify the first set identifier.

11. The method of claim 10, wherein the first set identifier is associated with a first plurality of modifying operations.

12. The method of claim 11, wherein the first plurality of modifying operations are recorded by appending a first plurality of metadata records to the metadata array, wherein the first plurality of metadata records comprises a first start record stored on the metadata array before the first write record to indicate a beginning of the first plurality of modifying operations associated with the first set identifier and a first end record stored on the metadata array after the first write record to indicate an ending of the first plurality of modifying operations associated with the first set identifier.

13. The method of claim 12, wherein the first payload record is recorded on the metadata array after the first end record.

14. The method of claim 8, further comprising:
l) after step k), receiving a revert operation request identifying the first set identifier;
m) recording the revert operation by appending a revert record to the metadata array without altering the first file data array;
n) after step l), receiving a second read operation request for the first file;

o) reading the metadata array including the first write record, the first payload record, the delete record, and the revert record;

p) constructing a second virtual array for the first file having a second length equal to the first file length after the first write operation request without applying the delete request, wherein the second virtual array maps to the first real file data for the first file in the first file data array.

15. The method of claim 8, further comprising: g) after step f), receiving a second write operation request for a second file including second real file data; h) appending a second write record concerning the second write operation to the metadata array; i) appending the second real file data to a second file data array separate from the metadata array and separate from the first file data array; j) identifying a second offset location for the second real file data in the second file data array and identifying a second length for the second real file data; and k) appending the second offset location and the second length to the metadata array in a second payload record.

16. The method of claim 15, further comprising:

l) receiving a copy operation request identifying the first file as a destination and the second file as a source, the identification of the second file as the source including a source data offset location and a source data length that identify a copied portion of the second real file data;

m) appending the copy operation to the metadata array as a copy record that identifies the copied portion.

17. The method of claim 16, further comprising:

n) after step m), receiving a second read operation request for the first file;

o) reading the metadata array including the first write record, the first payload record, the second write record, the second payload record, and the copy record; and p) constructing a virtual array for the first file having a length equal to a file length for the first file as determined after the first write operation request and the copy request, wherein the virtual array maps to the first real file data for the first file found in the first file data array and maps to the copied portion of the second real file data found in the second file data array.

18. A method comprising: a) receiving a set of modifying operations to a file, wherein the set of modifying operations includes: i) a first write operation to write first real file data, ii) a second write operation to write second real file data, and iii) a set identifier; b) appending the set of modifying operations to an append-only metadata array by appending a plurality of metadata records, the plurality of metadata records separately identifying the first and second write operations and associating both write operations with the set identifier; c) receiving the first real file data and the second real file date, wherein the first real file data and the second real file data are received after the plurality of metadata records are appended to the append-only metadata array; d) appending merged real file data to an append-only file data array distinct from the append-only metadata array, the merged real file data comprising a merger of the first real file data and the second real file data; e) identifying an offset location for the merged real file data in the append-only file data array and a length for the merged real file data; f) appending the offset location and length to the metadata array as an additional metadata record.

19. The method of claim 1, wherein a third record unassociated with the first set of modifying operations exists on the metadata array between the write record and the payload record.

20. The method of claim 19, wherein the third record relates to the first file.

* * * * *